(12) United States Patent
Whipple et al.

(10) Patent No.: US 11,077,515 B2
(45) Date of Patent: Aug. 3, 2021

(54) NOZZLE AND GAS DIFFUSER ASSEMBLIES FOR WELDING TORCHES

(71) Applicant: ILLINOIS TOOL WORKS INC., Glenview, IL (US)

(72) Inventors: Bradley Eugene Whipple, South Woodslee (CA); Jeffrey G. Wells, Bell River (CA)

(73) Assignee: Illinois Tool Works Inc., Glenview, IL (US)

( * ) Notice: Subject to any disclaimer, the term of this patent is extended or adjusted under 35 U.S.C. 154(b) by 428 days.

(21) Appl. No.: 15/855,356

(22) Filed: Dec. 27, 2017

(65) Prior Publication Data

US 2018/0178306 A1    Jun. 28, 2018

Related U.S. Application Data

(60) Provisional application No. 62/439,831, filed on Dec. 28, 2016.

(51) Int. Cl.
*B23K 9/29*      (2006.01)
*B23K 9/32*      (2006.01)
(Continued)

(52) U.S. Cl.
CPC .............. *B23K 9/291* (2013.01); *B23K 9/173* (2013.01); *B23K 9/26* (2013.01); *B23K 9/295* (2013.01); *B23K 9/32* (2013.01)

(58) Field of Classification Search
CPC .......... B23K 9/291; B23K 9/173; B23K 9/26; B23K 9/295; B23K 9/32
(Continued)

(56) References Cited

U.S. PATENT DOCUMENTS 3,488,468 A * 1/1970 Carbone ................ B23K 9/291
                                           219/136
3,690,567 A * 9/1972 Borneman ............. B23K 9/291
                                           239/591
(Continued)

FOREIGN PATENT DOCUMENTS

CA        2242273 A1    2/2000
FR        2499439      *   8/1982
(Continued)

OTHER PUBLICATIONS

Int'l Search Report and Written Opinon Appln No. PCT/US2017/08690 dated Apr. 20, 2018 (13 pgs).
(Continued)

*Primary Examiner* — Lien M Ngo
(74) *Attorney, Agent, or Firm* — McAndrews, Held & Malloy, Ltd.

(57) ABSTRACT

A nozzle assembly for a welding torch is disclosed. The nozzle assembly comprises a nozzle, a contact tip, and a gas diffuser assembly. The gas diffuser assembly comprises a gas diffuser, coupled to an insulator. The gas diffuser is also coupled to a gooseneck and the contact tip. The nozzle is coupled to the gas diffuser assembly, such that the contact tip is retained within the nozzle. The nozzle and gas diffuser assembly further include complementary engagement features to couple the nozzle to the gas diffuser assembly. The nozzle also includes a spatter deflector configured to deflect or block spatter from obstructing gas holes of the gas diffuser assembly.

16 Claims, 27 Drawing Sheets

(51) Int. Cl.
*B23K 9/173* (2006.01)
*B23K 9/26* (2006.01)

(58) Field of Classification Search
USPC .......... 222/137.42; 219/137.42, 136, 137.31, 219/137.63
See application file for complete search history.

(56) References Cited

U.S. PATENT DOCUMENTS

| | | | |
|---|---|---|---|
| 3,731,048 A | 5/1973 | Ogden | |
| 3,798,409 A * | 3/1974 | Troyer | B23K 9/295 219/137.41 |
| 4,403,136 A | 9/1983 | Colman | |
| 4,864,099 A | 9/1989 | Cusick | |
| 5,278,392 A | 1/1994 | Takacs | |
| 5,380,980 A * | 1/1995 | Colling | B23K 9/32 219/137.31 |
| 5,635,090 A | 6/1997 | Lubieniecki | |
| 6,211,490 B1 * | 4/2001 | Nosse | B23K 9/173 219/137.62 |
| 6,491,326 B1 | 12/2002 | Massey et al. | |
| 8,633,422 B2 * | 1/2014 | Giese | B23K 9/295 219/137.42 |
| 10,543,557 B2 * | 1/2020 | Carletti | B23K 9/295 |
| 2006/0289413 A1 * | 12/2006 | Eberle | B23K 9/295 219/137.31 |
| 2007/0056945 A1 | 3/2007 | Hammen | |
| 2007/0101842 A1 | 5/2007 | Gass | |
| 2008/0035623 A1 * | 2/2008 | Hutchison | B23K 9/123 219/136 |
| 2012/0125904 A1 | 5/2012 | Lee et al. | |
| 2015/0129570 A1 * | 5/2015 | Redding | B23K 9/285 219/137.31 |
| 2015/0190879 A1 * | 7/2015 | Kachline | B23K 9/295 219/137.42 |

FOREIGN PATENT DOCUMENTS

| | | |
|---|---|---|
| KR | 101412374 B1 | 6/2014 |
| WO | 2016132271 | 8/2016 |

OTHER PUBLICATIONS

European Patent Office, "Communication pursuant to Article 94(3) EPC," issued in connection with European Patent Application No. 17832456.2, dated Sep. 9, 2020, 4 pages.

* cited by examiner

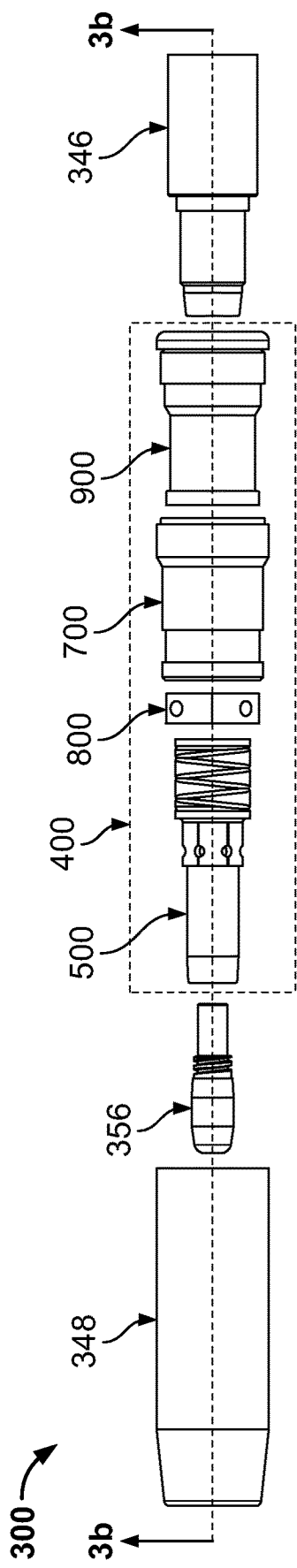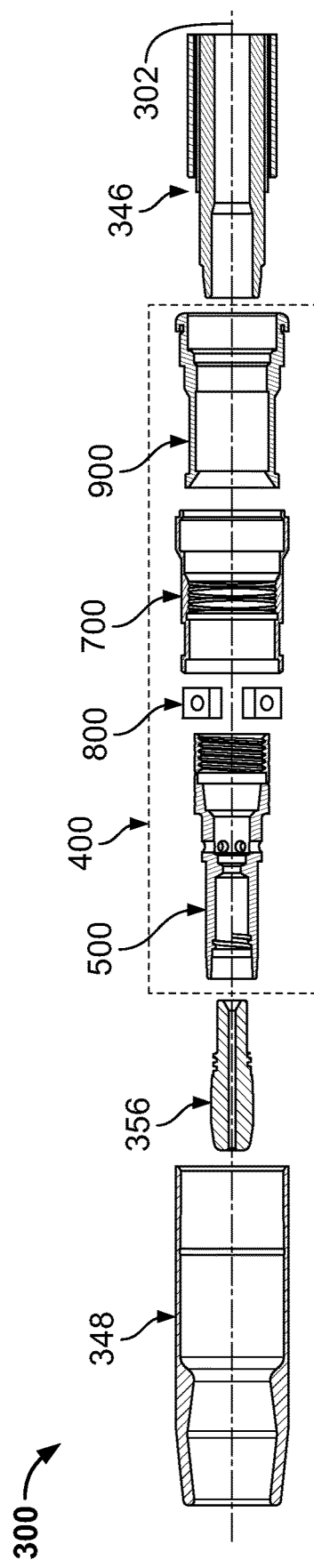

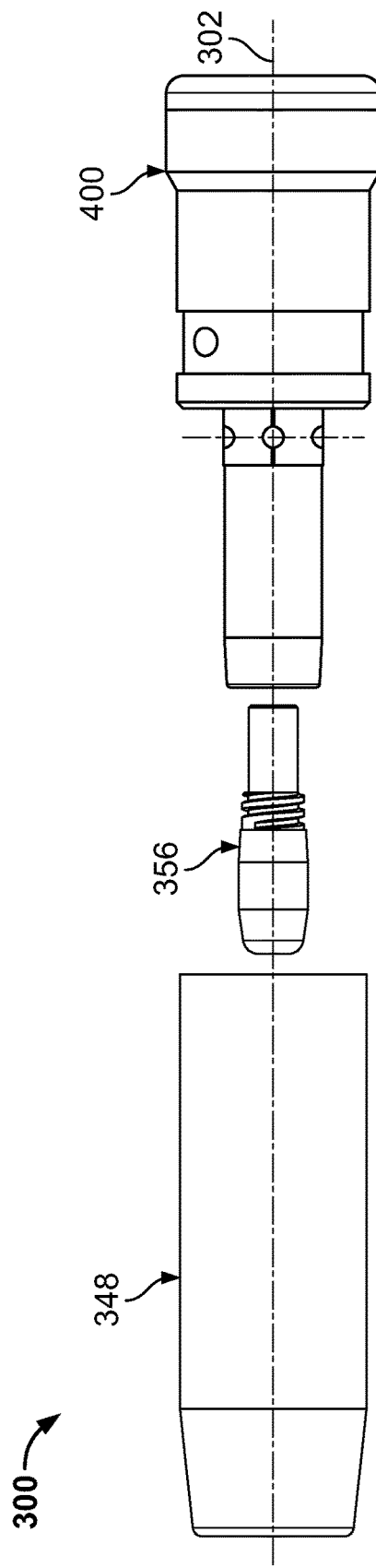
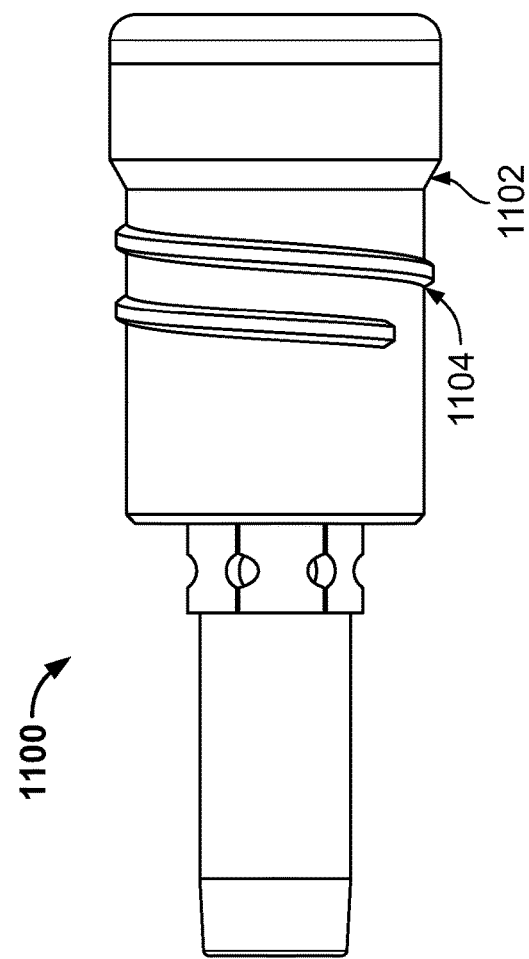

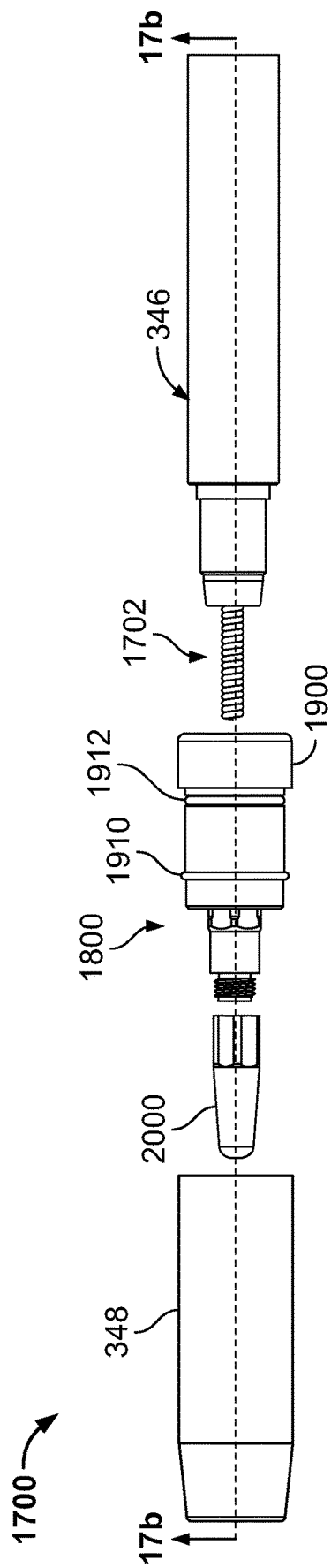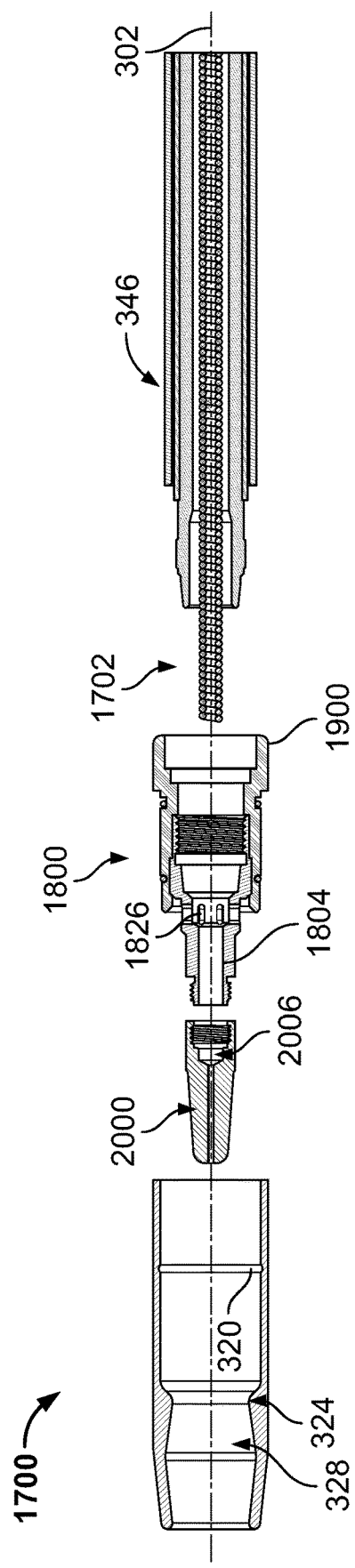

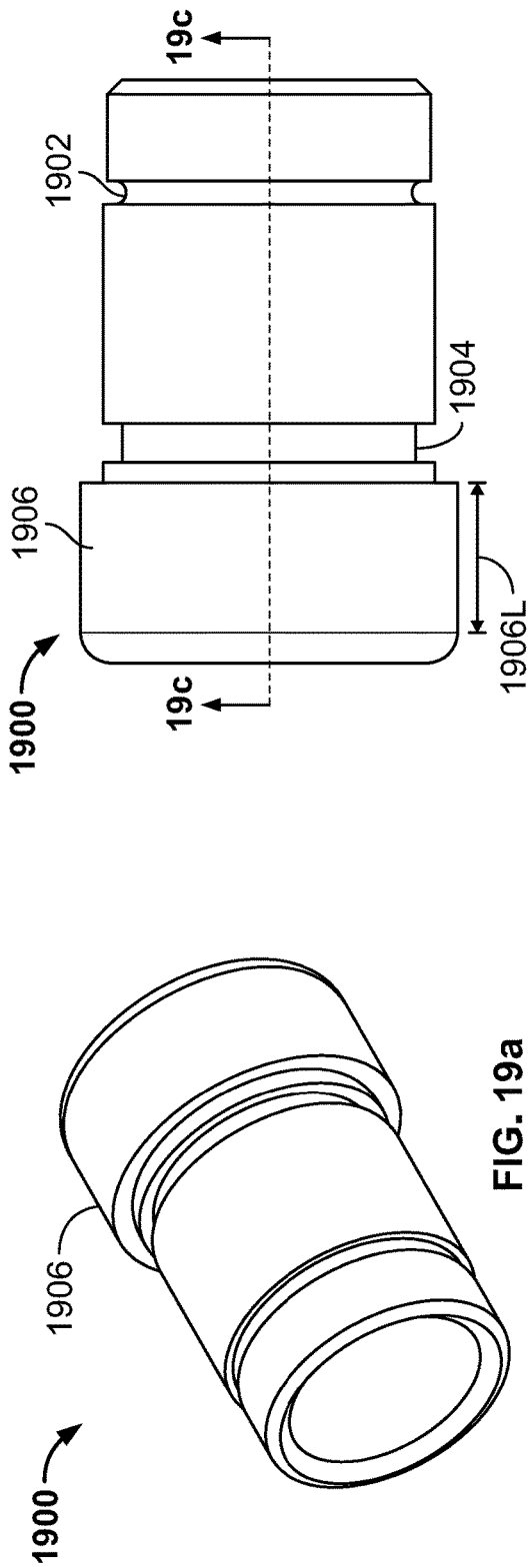

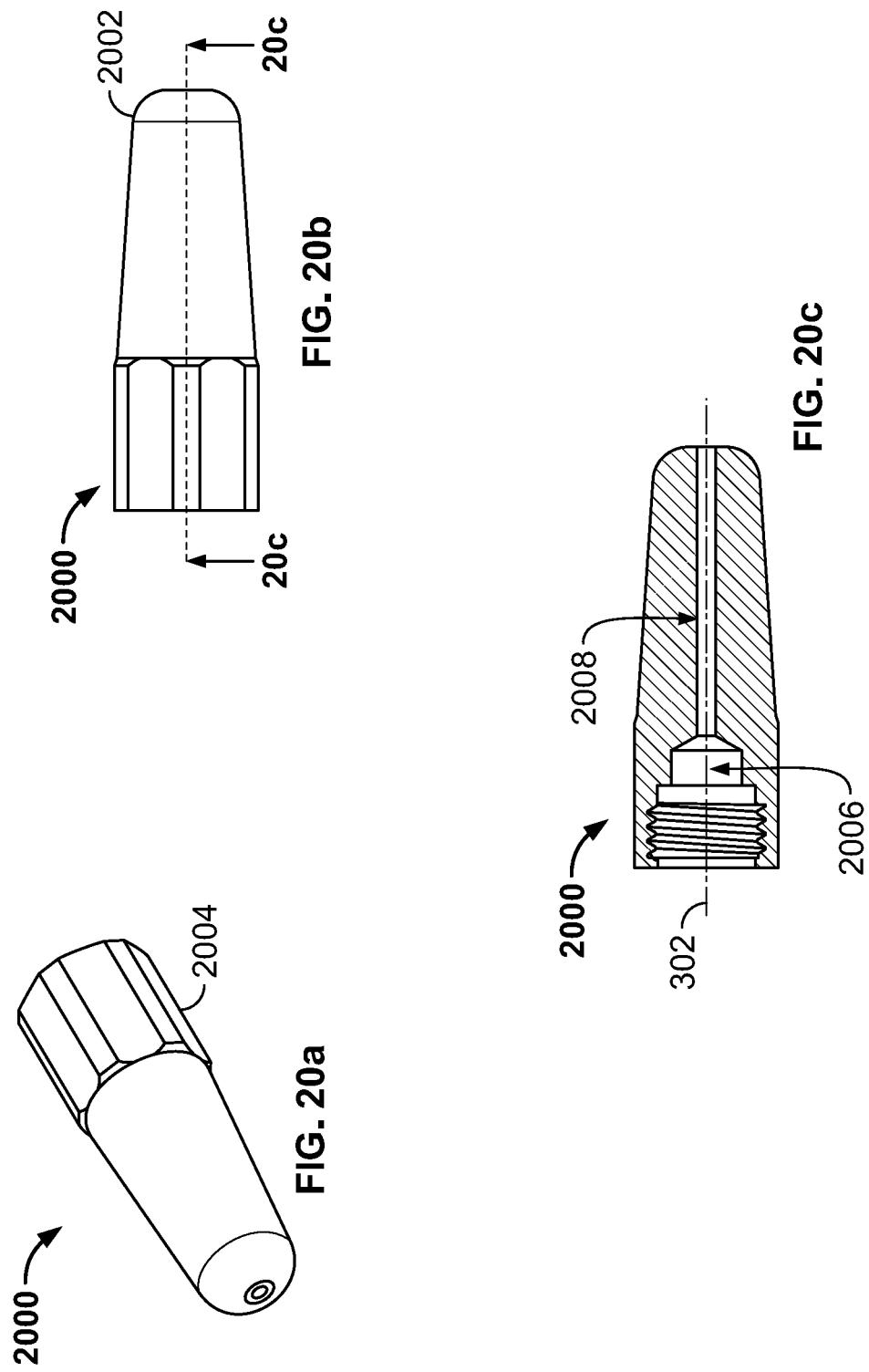

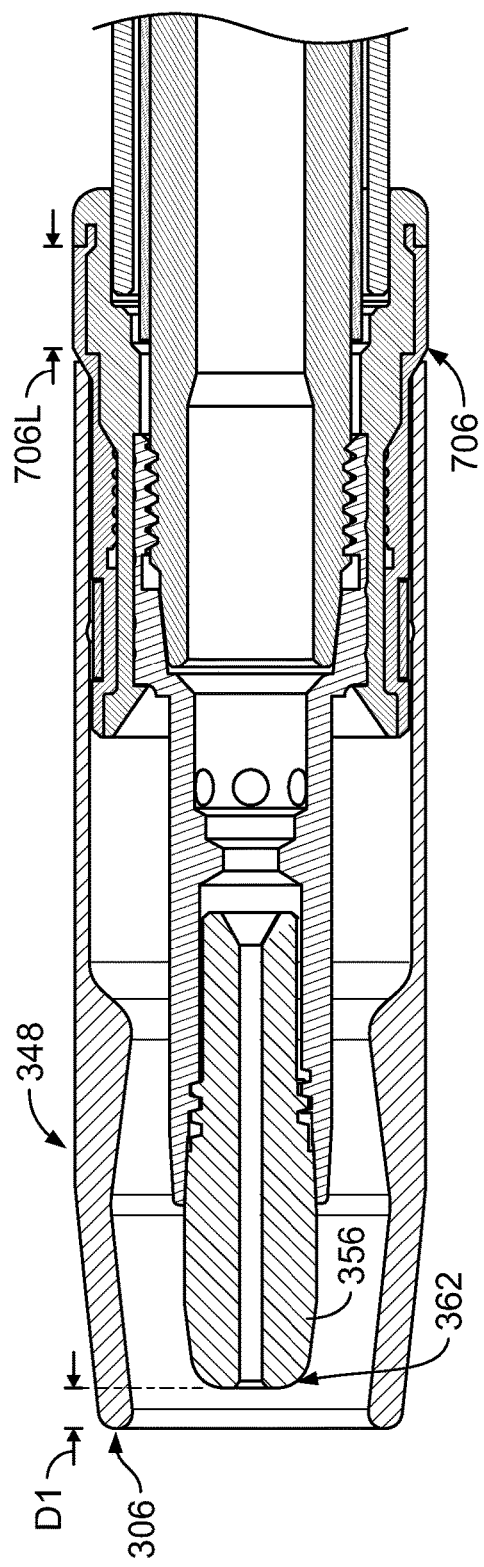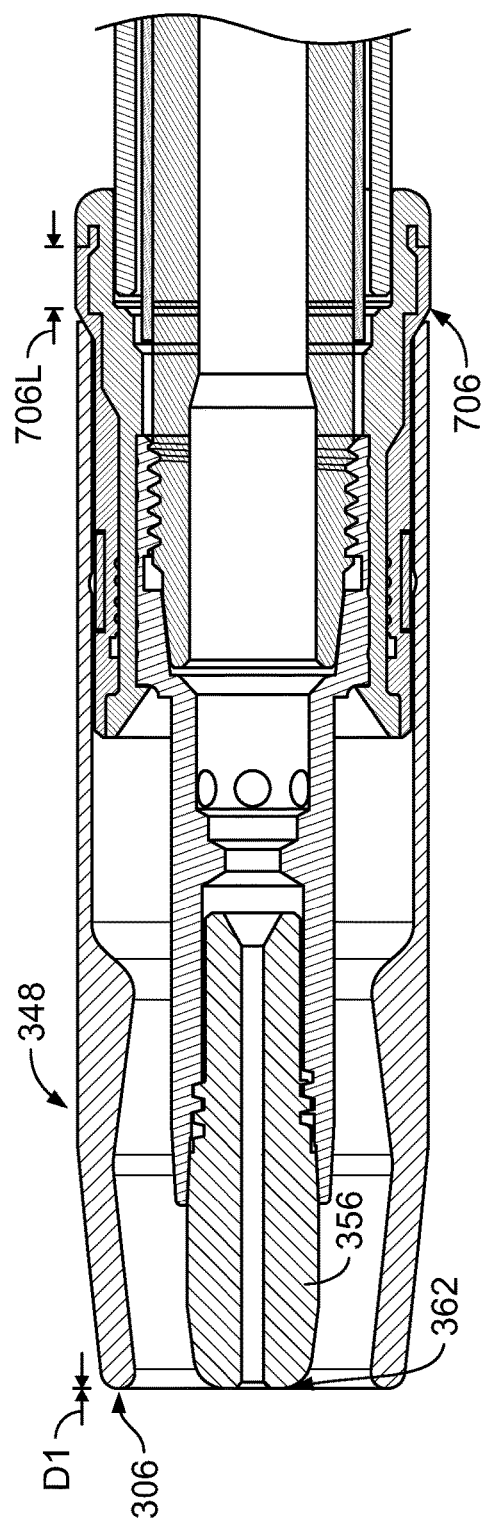
FIG. 22a
FIG. 22b

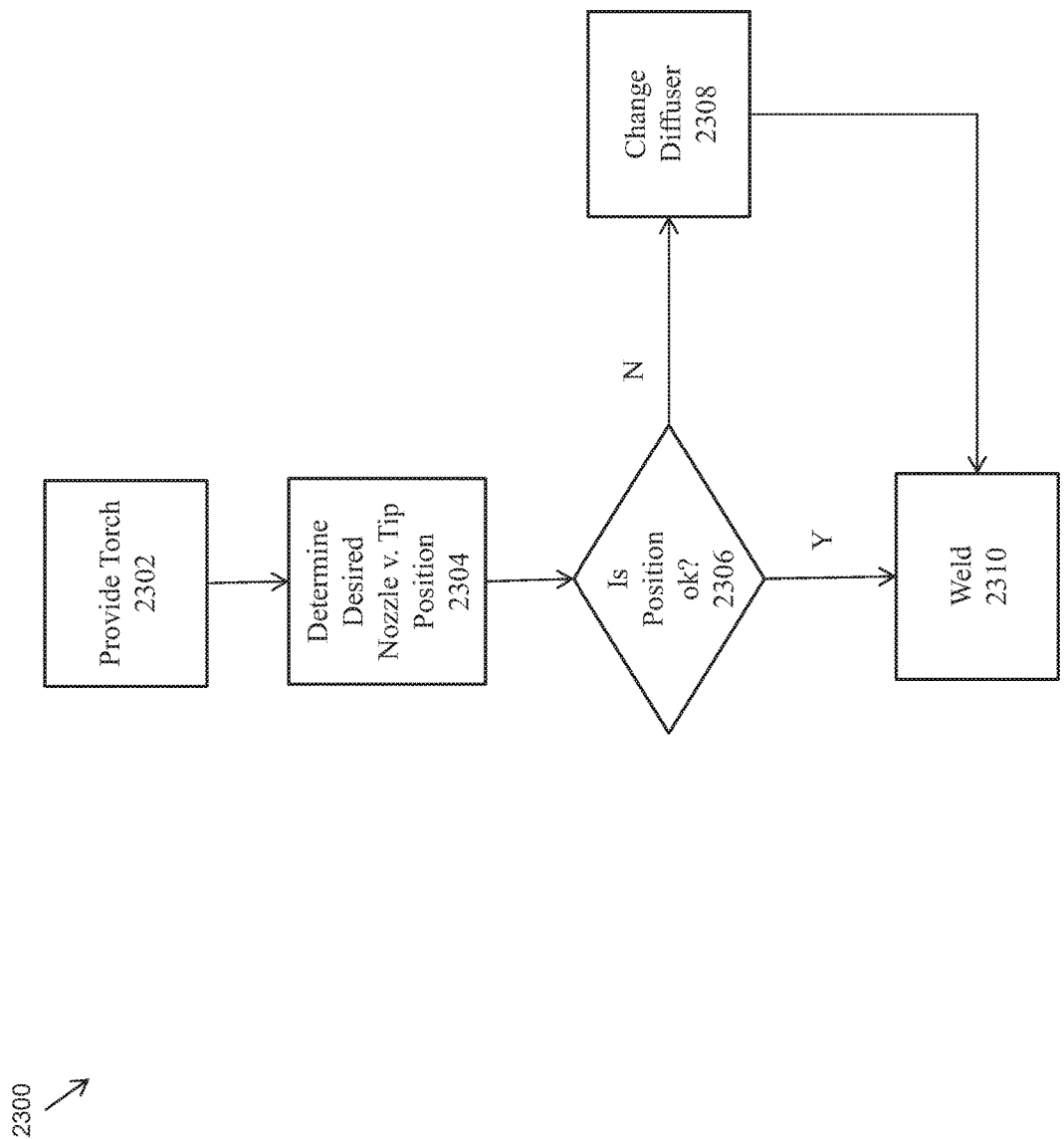

NOZZLE AND GAS DIFFUSER ASSEMBLIES FOR WELDING TORCHES

CROSS REFERENCE TO RELATED APPLICATIONS

The present application claims the benefit of U.S. Provisional Patent Application Ser. No. 62/439,831 filed Dec. 28, 2016, entitled "WELDING TORCHES, DIFFUSERS, INSULATORS, NOZZLES, AND CONTACT TIPS." The entire contents of U.S. Provisional Patent Application Ser. No. 62/439,831 are expressly incorporated herein by reference.

BACKGROUND

This disclosure generally relates to welding and, more particularly, to nozzles and gas diffuser assemblies for welding torches.

Conventional welding torches may suffer from one or more of the following issues: inadequate spatter resistance, inadequate access to welding components affected by spatter, inadequate nozzle durability, difficulty of use (particularly by low-skilled welders), and/or susceptibility to burn backs.

BRIEF SUMMARY

Systems and methods are provided for welding torches, diffusers, insulators, nozzles, and contact tips, substantially as shown in and/or described in connection with at least one of the figures, as set forth more completely in the claims.

These and other advantages, aspects and novel features of the present invention, as well as details of an illustrated example thereof, will be more fully understood from the following description and drawings.

BRIEF DESCRIPTION OF THE DRAWINGS

FIG. 3a is an exploded side view of an example nozzle assembly, in accordance with aspects of this disclosure.

FIG. 3b is an exploded side cross section view of the example nozzle assembly shown in FIG. 3a along line 3b-3b.

FIG. 5c is a side view of the example gas diffuser shown in FIG. 5a.

FIG. 6b is a side view of the example diffuser insert shown in FIG. 6a.

FIG. 6c is a front view of the example diffuser insert shown in FIG. 6a.

FIG. 7b is a side view of the example outer sleeve shown in FIG. 7a.

FIG. 9b is a side view of the example insulator shown in FIG. 9a.

FIG. 10c is a partially exploded side view of the example nozzle assembly of FIG. 3a, with the assembled gas diffuser assembly shown in FIG. 10a.

FIG. 11 is a side view of another example gas diffuser assembly, in accordance with aspects of this disclosure.

FIG. 12b is a side view of the example nozzle shown in FIG. 12a.

FIG. 13b is a partially transparent side view of the example nozzle shown in FIG. 13a.

FIG. 14c is a side view of the example contact tip shown in FIG. 14a.

FIG. 17a is an exploded side view of another example nozzle assembly, in accordance with aspects of this disclosure.

FIG. 17b is an exploded side cross section view of the example nozzle assembly shown in FIG. 17a along line 17b-17b.

FIG. 18b is a side view of the example gas diffuser shown in FIG. 18a.

FIG. 19a is a perspective view of another example insulator, in accordance with aspects of this disclosure.

FIG. 19b is a side view of the example insulator shown in FIG. 19a.

FIG. 19c is a side cross section view of the example insulator shown in FIG. 19b, along line 19c-19c.

FIG. 20a is a perspective view of another example contact tip, in accordance with aspects of this disclosure.

FIG. 20b is a side view of the contact tip shown in FIG. 20a.

FIG. 20c is a side cross section view of the contact tip shown in FIG. 20b, along line 20c-20c.

FIGS. 22a-22c are side cross section views of an example nozzle assembly, illustrating varying distances between an example contact tip and nozzle of the example nozzle assembly in proportion to a varying axial shoulder length of an example gas diffuser assembly of the nozzle assembly, in accordance with aspects of this disclosure.

FIG. 23 is a block diagram illustrating an example method of adjusting a position of a contact tip relative to a nozzle, in accordance with aspects of this disclosure.

The figures are not necessarily to scale. Similar or identical reference numerals may be used to refer to similar or identical components.

DETAILED DESCRIPTION OF THE INVENTION

Figure 1:
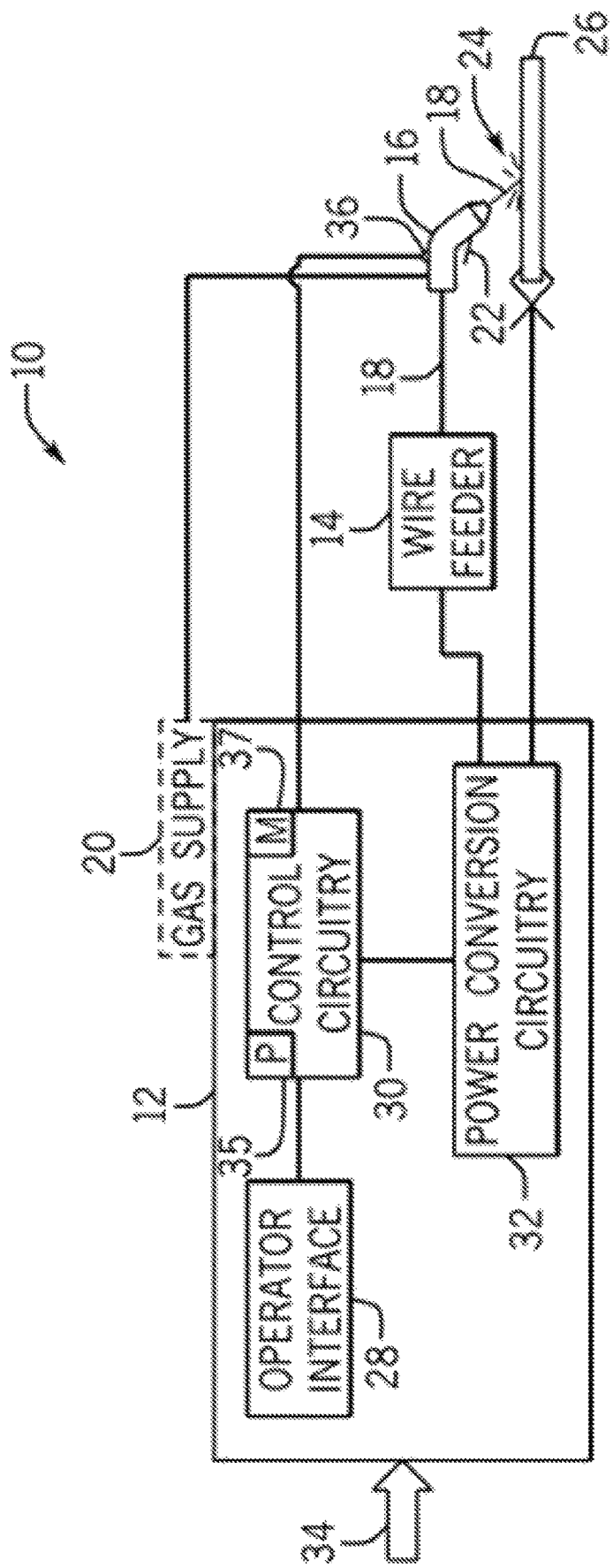
FIG. 1 is a block diagram illustrating an example welding system, in accordance with aspects of this disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g.," and "for example" set off lists of one or more non-limiting examples, instances, or illustrations.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

The terms "coupled," "coupled to," and "coupled with" as used herein, each mean a structural and/or electrical connection, whether attached, affixed, connected, joined, fastened, linked, and/or otherwise secured. The term "attach" means to affix, couple, connect, join, fasten, link, and/or otherwise secure. The term "connect," means to attach, affix, couple, join, fasten, link, and/or otherwise secure.

The terms "about" and/or "approximately," when used to modify or describe a value (or range of values), position, orientation, and/or action, mean reasonably close to that value, range of values, position, orientation, and/or action. Thus, the embodiments described herein are not limited to only the recited values, ranges of values, positions, orientations, and/or actions but rather should include reasonably workable deviations.

As used herein, the term "front" means closer to a welding point, while "rear" means farther from a welding point.

Some examples of the present disclosure may relate to a gas diffuser assembly for a welding torch. The gas diffuser assembly may include a gas diffuser having an external surface configured to frictionally engage an insulator so as to resist movement of the insulator relative to the external surface, and an insulator affixed to the external surface of the gas diffuser.

In some examples, the external surface may comprise a grooved, knurled, textured, or cornered surface. In some examples, the insulator may be a thermoset plastic insulator. In some examples, the insulator may be a silicone based thermoset plastic insulator. In some examples, an outer sleeve may be fit over the insulator, and the insulator may couple the outer sleeve to the gas diffuser. In some examples, the outer sleeve may comprise a metal material. In some examples, the external surface of the gas diffuser may comprise a grooved surface, the outer sleeve may comprise an internal grooved surface, and the insulator may be molded into the grooves of the outer sleeve and the gas diffuser. In some examples, the insulator may be overmolded or injection molded over the external surface of the gas diffuser. In some examples, the outer sleeve may comprise one or more engagement features configured to mate with one or more complementary engagement features of a nozzle. In some examples, the insulator may comprise one or more engagement features configured to mate with one or more complementary engagement features of a nozzle.

Some examples of the present disclosure may relate to an arc welding torch, comprising a body, a gooseneck coupled to the body, a gas diffuser assembly coupled to the gooseneck, a contact tip retained by the gas diffuser assembly, and a nozzle coupled to the gas diffuser assembly. The gas diffuser assembly may comprise a gas diffuser having an external surface configured to frictionally engage an insulator so as to resist movement of the insulator relative to the external surface. The gas diffuser may further comprise an insulator affixed to the external surface of the gas diffuser. The insulator may be configured to insulate the nozzle from electrical current conducted through the gas diffuser.

In some examples, the external surface of the gas diffuser may comprise a grooved, knurled, textured, or cornered surface. In some examples, the insulator may be a thermoset plastic insulator. In some examples, the insulator may be a silicone based thermoset plastic insulator. In some examples, an outer sleeve may be fit over the insulator, where the insulator couples the outer sleeve to the gas diffuser. In some examples, the outer sleeve may comprise a tapered shoulder configured to mate with a complementary taper of the nozzle, where a width of the shoulder determines a position of the nozzle with respect to the contact tip.

Some examples of the present disclosure may relate to a method of modifying a position of a contact tip relative to a nozzle. The method may comprise the steps of providing a welding torch having a longitudinal axis. The welding torch may comprise a nozzle having a front end and a rear end, a first gas diffuser assembly coupled to the nozzle, and a contact tip coupled to the first gas diffuser assembly. The first gas diffuser assembly may comprise a first shoulder that abuts the rear end of the nozzle, thereby preventing the nozzle from moving axially beyond the shoulder. The first shoulder may have a first axial length. A front end of the contact tip may be spaced from the front end of the nozzle by a first distance. The method may further comprise the step of replacing the first gas diffuser assembly with a second gas diffuser assembly. The second gas diffuser assembly may comprise a second shoulder having a second axial length that is different from the first axial length. The front end of the contact tip may be spaced from the front end of the nozzle by a second distance that is different from the first distance.

In some examples, the difference between the first distance and the second distance may be equal to the difference between the first axial length and the second axial length. In some examples, the contact tip may be retained entirely within the nozzle when the contact tip is coupled to the first gas diffuser, and the contact tip may not retained entirely within the nozzle when the contact tip is coupled to the second gas diffuser. In some examples, the contact tip may be retained entirely within the nozzle when the contact tip is coupled to the second gas diffuser, and the contact tip may not be retained entirely within the nozzle when the contact tip is coupled to the first gas diffuser.

Disclosed examples provide a heavy duty nozzle that provides the same or better performance than conventional heavy duty nozzles, while being smaller than conventional heavy duty nozzles. The disclosed example nozzles also substantially reduce the amount of spatter that reaches and/or adheres to gas holes in the nozzle (deemed to be the most critical area to keep clear of spatter), while also reducing the amount of spatter that reaches and/or adheres to an internal area of the nozzle proximate the gas holes.

The location of the gas holes on the gas diffuser allow for easier cleaning. The gas holes are positioned on edges of a hexagonal hub of the diffuser, rather than on the flats of the diffuser. This makes it easier for a reamer blade to get close enough to the gas holes to remove spatter. Disclosed examples therefore improve the ease of cleaning for the user.

Disclosed example nozzles have improved durability by making the nozzle a single part rather than an assembly of multiple parts. The single piece nozzle improves the durability of the nozzle due to the elimination of the G7 insulator of conventional welding torches. In conventional weld torches, the G7 insulator breaks down over time from exposure to the heat of the arc and causes the nozzle to wear. Disclosed examples omit a G7 insulator from the nozzle, and include an insulator in the gas diffuser assembly instead, thereby reducing the number of nozzle parts.

FIG. 1 shows an example of a metal inert gas (MIG) welding system 10 that may use any of the example diffusers, the example insulators, the example nozzles, the example contact tips, the example welding torch assemblies, and/or the example method discussed below. While the welding system 10 is a MIG welding system, other types of welding systems may be used. FIG. 1 illustrates a welding system 10 as including a power source 12 coupled to a wire feeder 14. In the illustrated example, the power source 12 is separate from the wire feeder 14, such that the wire feeder 14 may be positioned at some distance from the power source 12 near a welding location. However, it should be understood that the wire feeder 14, in some implementations, may be integral with the power source 12. The power source 12 may supply weld power to a torch 16 through the wire feeder 14, or the power source 12 may supply weld power directly to the torch 16. The wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. An operator may engage a trigger 22 of the torch 16 to initiate an arc 24 between the electrode 18 and a work piece 26. In some examples, the welding system 10 may be triggered by an automation interface including, but not limited to, a programmable logic controller (PLC) or robot controller. The welding system 10 is designed to provide welding wire (e.g., electrode 18), weld power, and shielding gas to the welding torch 16. As will be appreciated by those skilled in the art, the welding torch 16 may be of many different types, and may facilitate use of various combinations of electrodes 18 and gases.

The welding system 10 may receive data settings from the operator via an operator interface 28 provided on the power source 12. The operator interface 28 may be incorporated into a faceplate of the power source 12, and may allow for selection of settings such as the weld process (e.g., stick, TIG, MIG), the type of electrode 18 to be used, voltage and current settings, transfer mode (e.g., short circuit, pulse, spray, pulse), and so forth. In particular, the welding system 10 allows for MIG welding (e.g., pulsed MIG welding) with electrodes 18 (e.g., welding wires) of various materials, such as steel or aluminum, to be channeled through the torch 16. The weld settings are communicated to control circuitry 30 within the power source 12.

The control circuitry 30 operates to control generation of welding power output that is applied to the electrode 18 by power conversion circuitry 32 for carrying out the desired welding operation. For example, in some examples, the control circuitry 30 may be adapted to regulate a pulsed MIG welding regime that may have aspects of short circuit transfer and/or of spray transfer of molten metal from the welding wire to a molten weld pool of a progressing weld. Such transfer modes may be controlled during operation by adjusting operating parameters of current and voltage pulses for arcs 24 developed between the electrode 18 and the work piece 26.

The control circuitry 30 is coupled to the power conversion circuitry 32, which supplies the weld power (e.g., pulsed waveform) that is applied to the electrode 18 at the torch 16. The power conversion circuitry 32 is coupled to a source of electrical power as indicated by arrow 34. The power applied to the power conversion circuitry 32 may originate in the power grid, although other sources of power may also be used, such as power generated by an engine-driven generator, batteries, fuel cells or other alternative sources. Components of the power conversion circuitry 32 may include choppers, boost converters, buck converters, inverters, and so forth.

The control circuitry 30 controls the current and/or the voltage of the weld power supplied to the torch 16. The control circuitry 30 may monitor the current and/or voltage of the arc 24 based at least in part on one or more sensors 36 within the wire feeder 14 or torch 16. In some examples, a processor 35 of the control circuitry 30 determines and/or controls the arc length or electrode extension based at least in part on feedback from the sensors 36. The arc length is defined herein as the length of the arc between the electrode 18 and the work piece 26. The processor 35 determines and/or controls the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30. Operation of the power source 12 may be controlled in one or more modes, such as a constant voltage (CV) regulation mode in which the control circuitry 30 controls the weld voltage to be substantially constant while varying the weld current during a welding operation. That is, the weld current may be based at least in part on the weld voltage. Additionally, or in the alternative, the power source 12 may be controlled in a current control mode in which the weld current is controlled independent of the weld voltage. In some examples, the power source 12 is controlled to operate in a constant current (CC) mode where the control circuitry 30 controls the weld current to be substantially constant while varying the weld voltage during a welding operation.

Figure 2:
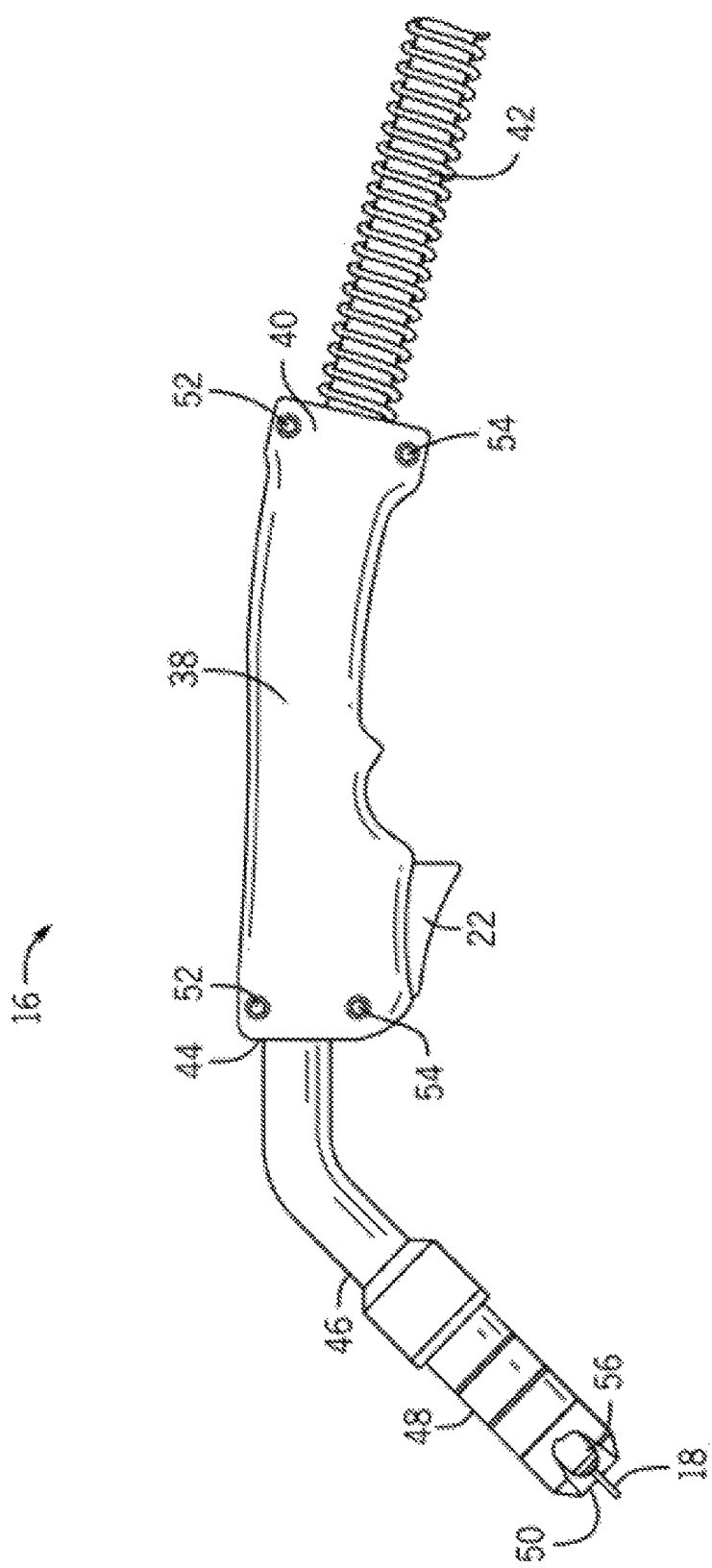
FIG. 2 is a side view of an example welding torch, in accordance with aspects of this disclosure.

FIG. 2 is a side view of an example of a welding torch 16 of the MIG welding system of FIG. 1, which may use any of the example gas diffusers, the example insulators, the example nozzles, the example gas diffuser assemblies, the example nozzle assemblies, and/or the example contact tips discussed below. As discussed in relation to FIG. 1, the torch 16 includes the trigger 22 for initiating a weld and supplying the electrode 18 to the weld. Specifically, the trigger 22 is disposed on a handle 38. A welding operator holds the handle 38 when performing a weld. At a first end 40, the handle 38 is coupled to a cable 42 where welding consumables (e.g., the electrode, the shielding gas, and so forth) are supplied to the weld. Welding consumables generally travel through the handle 38 and exit at a second end 44, which is disposed on the handle 38 at an end opposite from the first end 40.

The torch 16 includes a gooseneck 46 extending out of the second end 44 of the handle 38. As such, the gooseneck 46 is coupled between the handle 38 and a welding nozzle 48. As should be noted, when the trigger 22 is pressed or actuated, welding wire (e.g., electrode 18) travels through the cable 42, the handle 38, the gooseneck 46, and the welding nozzle 48, so that the welding wire extends out of an end 50 (i.e., torch tip) of the welding nozzle 48. Further, as illustrated in FIG. 2, the handle 38 is secured to the gooseneck 46 via fasteners 52 and 54, and to the cable 42 via fasteners 52 and 54. The welding nozzle 48 is illustrated with a portion of the welding nozzle 48 removed to show the electrode 18 extending out of a contact tip 56 that is disposed within the welding nozzle 48. While the example torch 16 illustrated in FIG. 2 is designed for welding by a human operator, one or more torches designed for use by a robotic welding system may alternatively, or additionally, be used with the welding system of FIG. 1. For example, the torch 16 may be modified to omit the trigger 22, may be adapted for water cooling, etc. The example torch 16 illustrated in FIG. 2 may also be used with any of the example gas diffusers, the example insulators, the example nozzles, the example gas diffuser assemblies, the example nozzle assemblies, and/or the example contact tips discussed below.

FIG. 3a is an exploded side view of an example nozzle assembly 300, such as might be used with the welding torch 16 and/or welding system 10. The nozzle assembly 300 may be coupled to a gooseneck 346 of the welding torch 16. The nozzle assembly 300 includes a nozzle 348, a contact tip 356, and a gas diffuser assembly 400. When assembled, the components of the nozzle assembly 300 share a longitudinal axis 302 that extends through an approximate middle of the nozzle assembly 300. FIG. 3b is a cross-sectional view of the example exploded nozzle assembly 300 of FIG. 3a.

Figure 4:
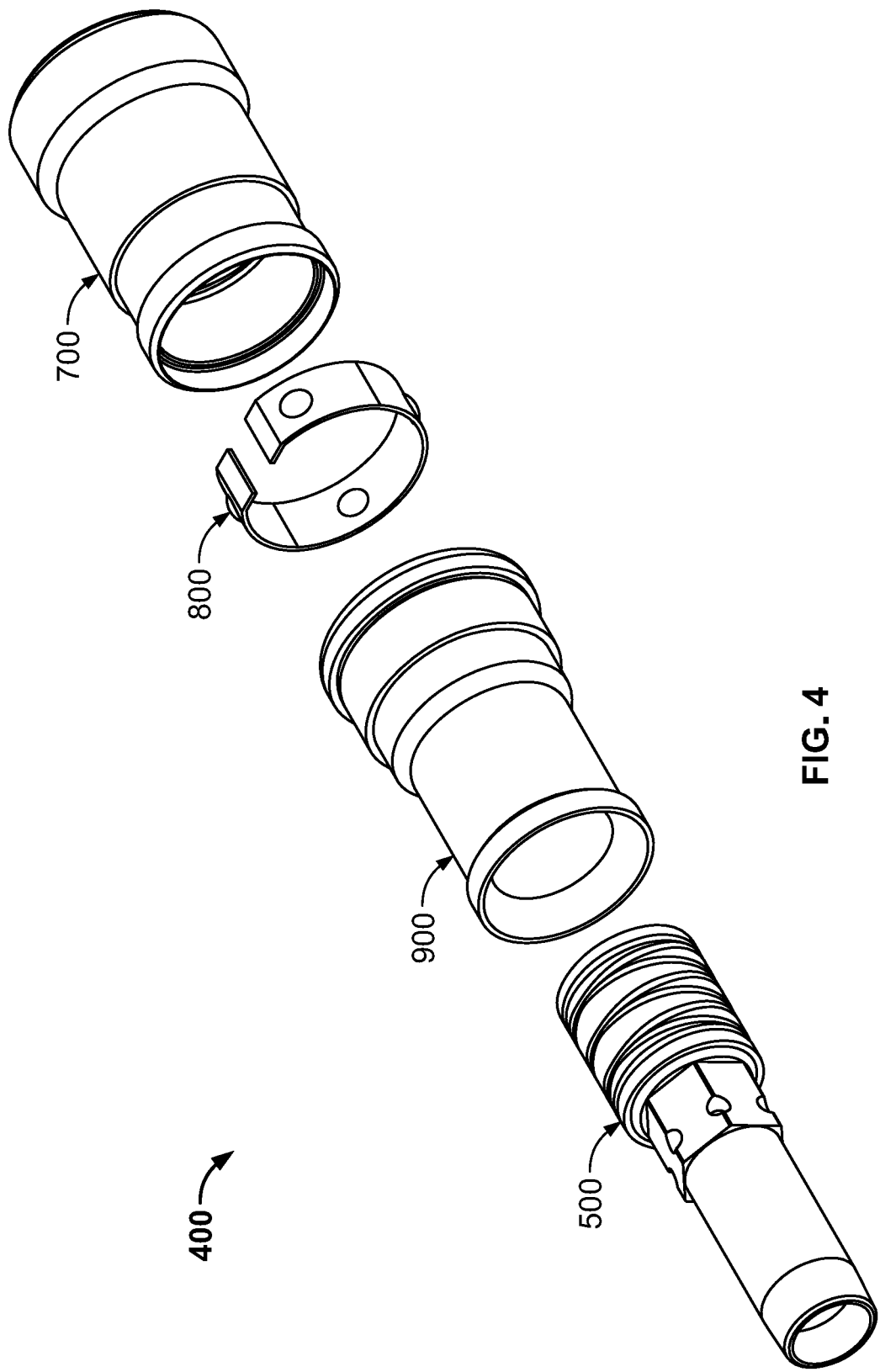
FIG. 4 is an exploded perspective view of an example gas diffuser assembly, in accordance with aspects of this disclosure.

FIG. 4 is an exploded perspective view of an example gas diffuser assembly 400. The gas diffuser assembly 400 includes a gas diffuser 500, an insulator 900, a retaining ring 800, and an outer sleeve 700. When assembled, the gas diffuser assembly 400 provides insulation to the nozzle assembly 300, which allows a single piece nozzle 348 to be used rather than requiring a separate insulator directly coupled to the nozzle 348. The gas diffuser 500 also includes engagement features that allow for a single nozzle to be used for varying types and/or sizes of contact tips and/or various desired contact tip stick-out (e.g. protruding from nozzle, recessed within nozzle, or flush with nozzle).

FIGS. 5a-5d show various views of the example gas diffuser 500. The gas diffuser 500 acts as an interface between the gooseneck 346 and the contact tip 356. The gas diffuser 500 is configured to transfer electrical energy to the contact tip 356 from the gooseneck 346 and transfer heat energy from the contact tip 356 back into the gooseneck 346. While other components may cooperate with the gas diffuser 500, the gas diffuser 500 provides the primary transmission path for heat and electrical current between the contact tip 356 and the gooseneck 346. To increase the amount of electrical and heat energy transferred, the gas diffuser 500 may be constructed using an electrically conductive and/or thermally conductive material. Examples of potential materials include brass, bronze (e.g. C314 bronze), steel, aluminum, and/or copper. In some examples, the gas diffuser 500 may be constructed using other materials and/or alloys that offer similar or better thermal and/or electrical properties.

In some examples, the gas diffuser 500 includes a base 502 at the rear end 504 of the gas diffuser 500, a nose 506 at the front end 508 of the gas diffuser 500, and a hub 510 that couples the nose 506 to the base 502. A bore (and/or passage) 511 extends through an approximate middle (and/or center) of the gas diffuser 500. The bore 511 extends from the front end 508 through to the rear end 504. The bore 511 accommodates movement of welding consumables (e.g. wire electrode 18 and/or shielding gas) from the gooseneck 346 through the gas diffuser 500 and/or gas diffuser assembly 400. The example bore 511 includes multiple sections along a length of the bore 511, each section having a respective diameter.

In some examples, the gas diffuser 500 is configured to be coupled to the gooseneck 346 through the base 502 of the gas diffuser 500. The base 502 of the gas diffuser 500 is approximately cylindrical, though it may be formed in different shapes in other examples. The base 502 of the gas diffuser 500 may include screw threads 512 on an internal surface 514 of the gas diffuser 500. The screw threads 512 may be configured to engage matching screw threads on an external surface of the gooseneck 346, so as to couple the gas diffuser 500 to the gooseneck 346. The base 502 may further include a taper 516 on the internal surface 514 of the base 502. The taper 516 narrows the diameter of the bore 511, such that the bore 511 has a larger diameter towards the rear end 504 of the gas diffuser 500, proximate the screw threads 512, and a smaller diameter towards the middle of the gas diffuser 500, proximate a hub 510. The taper 516 may be configured to engage a matching taper on the gooseneck 346, so as to frictionally fit the gooseneck 346 within the base 502 and lock the gooseneck 346 in place. In some examples, the base 502 may include different and/or additional engagement features to secure the gas diffuser 500 to the gooseneck 346.

In some examples, the base 502 of the gas diffuser 500 may include features configured to frictionally engage a material so as to resist movement of the material relative to the external surface. In some examples, these features may include grooves 518 on an external surface 520 of the gas diffuser 500. In the example of FIGS. 5a-5d, the grooves 518 are formed helically. The grooves 518 use two patterns, a clockwise pattern and a counter clockwise pattern. Radial grooves are formed at each end of the helix. The grooves 518 provide space into which the insulator 900 may be molded during an injection molding process or an over molding process. Molding the insulator 900 into the grooves 518 may improve the mechanical bond between the insulator 900 and the gas diffuser 500, and keep the whole gas diffuser assembly 400 together when torque and/or tension/compression is applied to the gas diffuser assembly 400. In some examples, knurling may be used instead of, or in addition to, the grooves 518, so as to provide a textured surface into which the insulator 900 material may be molded. In some examples, a cornered surface may be included instead of, or in addition to, knurling or grooves 518, such that the insulator 900 may be molded around the corners, which still might provide more of frictional engagement than molding the insulator 900 onto a smooth rounded surface. In some examples, vapor deposition, additive manufacturing, and/or other methods besides molding may be used to affix the insulator 900 to the gas diffuser 500.

In some examples, the gas diffuser 500 may include a hub 510 with a polygon profile. While different types of polygons may be used (e.g. triangle, square, octagon, pentagon, etc.), in the example shown in FIGS. 5a-5d, the hub 510 is formed with a hexagonal profile, having six flat sides 522 (or flats) and six edges 524, with one edge 524 between every two flats 522 and/or one flat 522 between every two edges 524. Gas holes 526 (and/or ports) extend through each edge 524 of the hub 510. More particularly, the gas holes 526 are positioned so that a center of each gas hole 526 is positioned approximately along an edge 524 of the hub. Thus, if one were to project the edge 524 through the gas hole 526, the edge 524 would approximately bisect the gas hole 526, splitting it into two halves. In some examples, each half of a gas hole 526 may extend at least partially through a portion of an adjacent flat 522. Positioning the gas holes 526 on the edges 524 of the hub 510 allow for easier and/or more effective cleaning of the gas holes 526 than if the gas holes 526 were on the flats 522. When using a reamer to clean off spatter adhering to the inside of a nozzle 348, the jutting edges 524 (or points on a 2D hexagon) may make easier targets than the flats 522. In some examples, however, the gas holes 526 may be positioned such that the gas holes 526 extend entirely through the flats 522, rather than the edges 524, and/or through portions of the nose 506 (as shown for example in FIG. 5b). However, locating the gas holes 526 entirely on the flats 522 or on the rounded surface of the nose 506 may be less conducive to proper cleaning, because the reamer blade may not be able to get sufficiently close to thoroughly clean the gas holes 526.

Figure 5A:
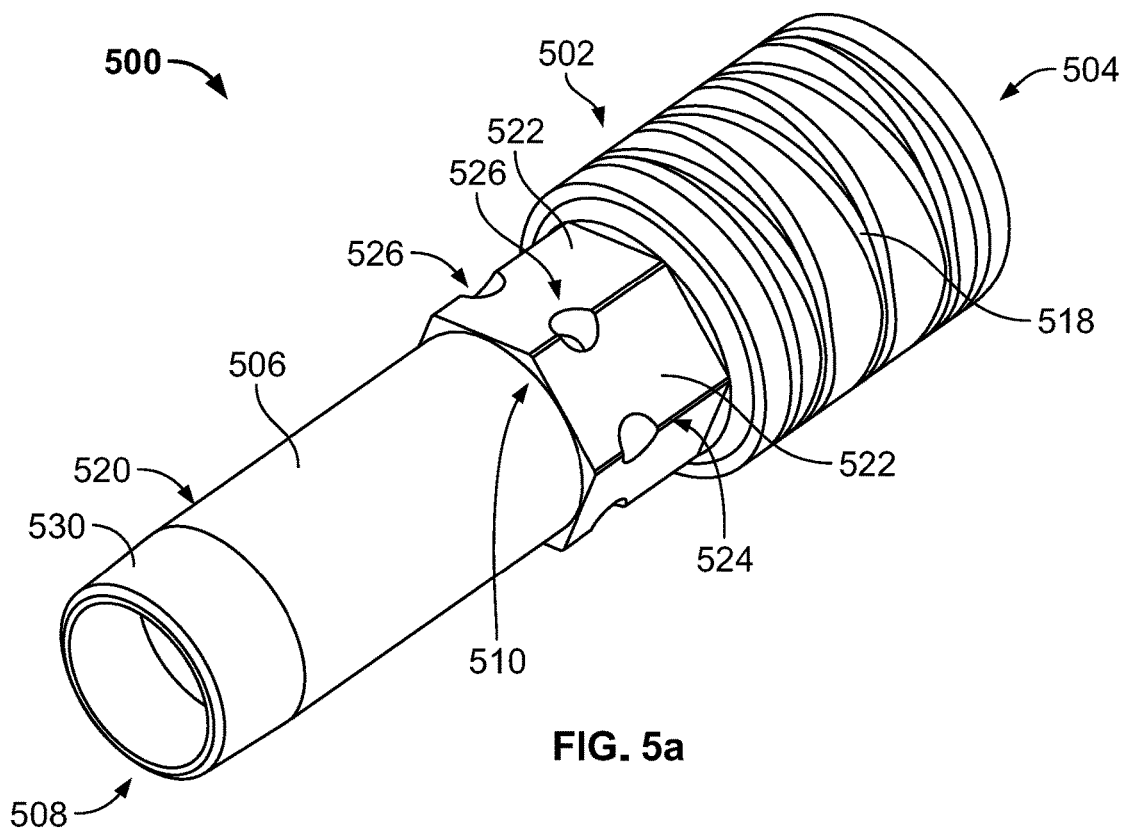
FIG. 5a is a perspective view of an example gas diffuser, in accordance with aspects of this disclosure.
Figure 5B:
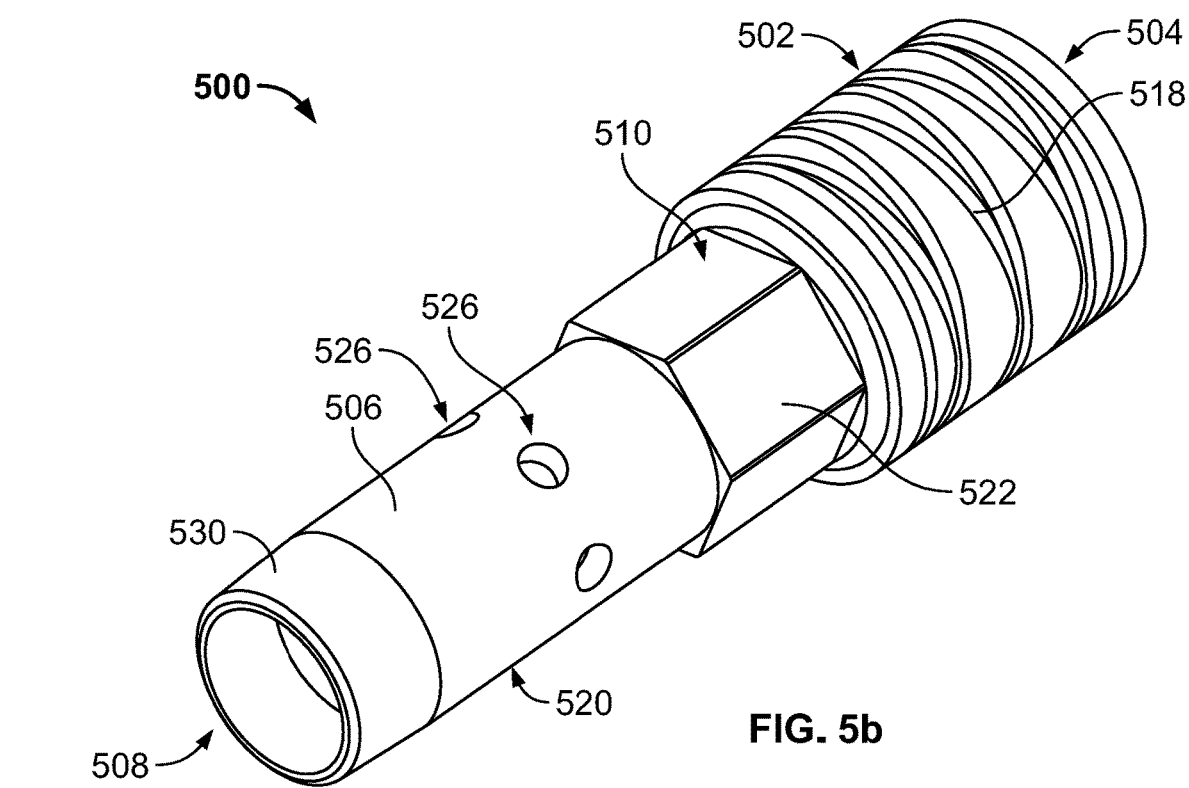
FIG. 5b is a perspective view of another example gas diffuser, in accordance with aspects of this disclosure.
Figure 5C:
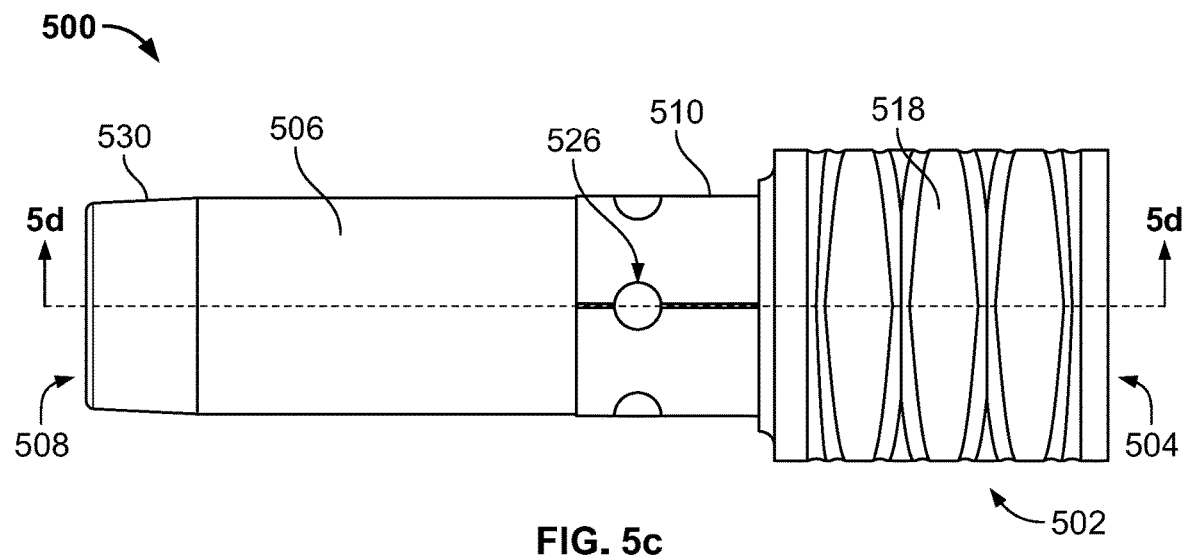
Figure 5D:
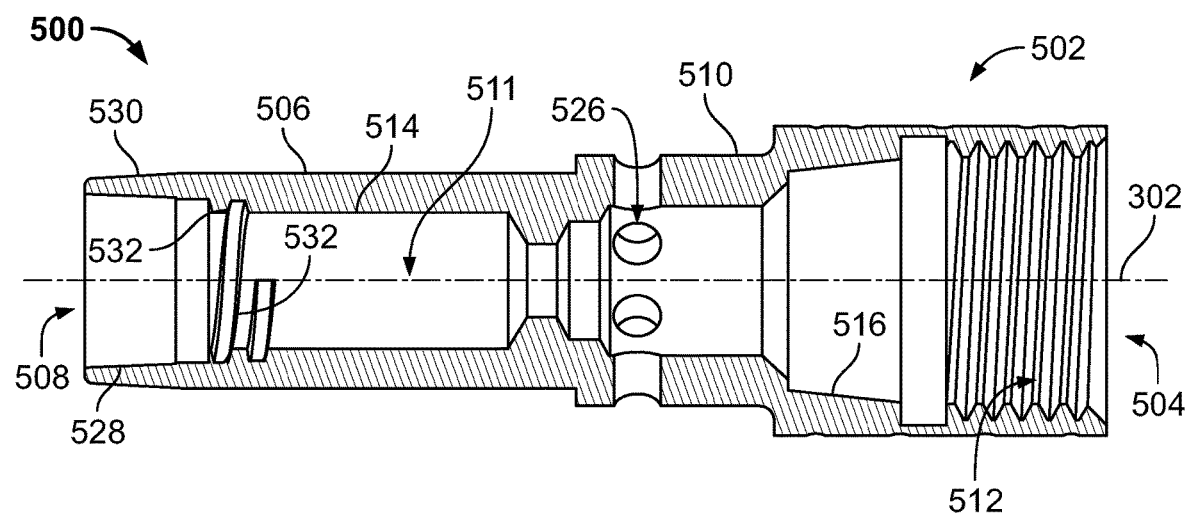
FIG. 5d is a side cross section view of the example gas diffuser shown in FIG. 5c, along line 5c-5c.
Figure 6A:
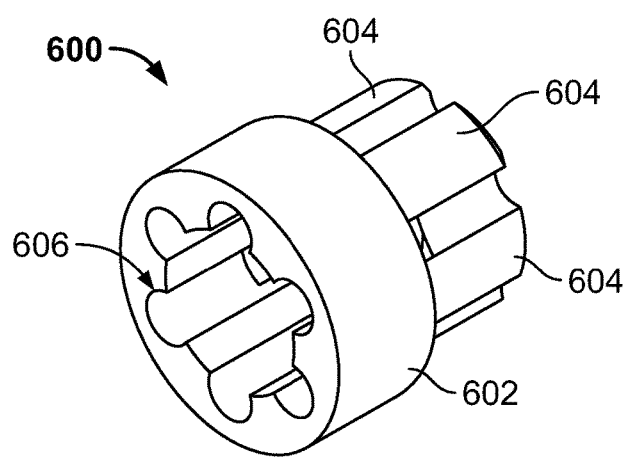
FIG. 6a is a perspective view of an example diffuser insert, in accordance with aspects of this disclosure.
Figure 6B:
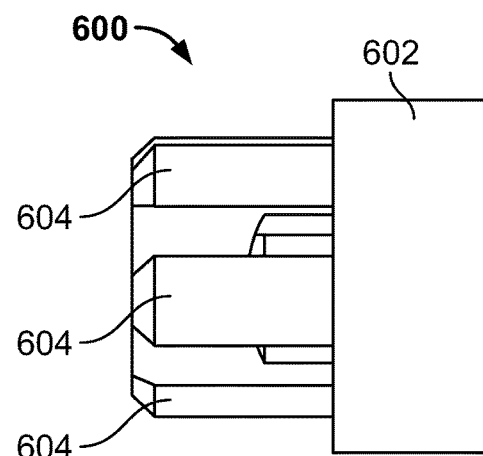
Figure 6C:
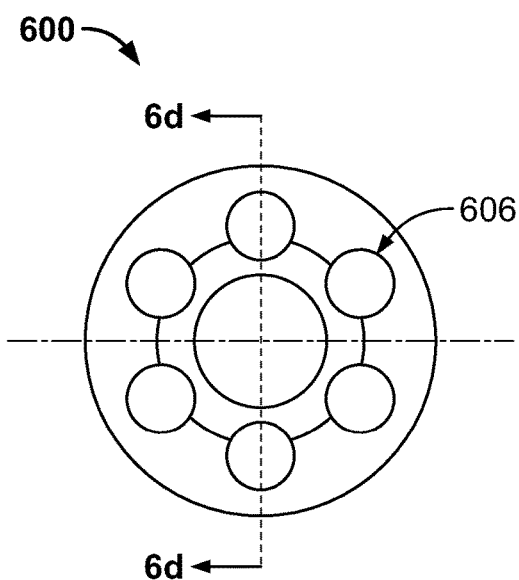
Figure 6D:
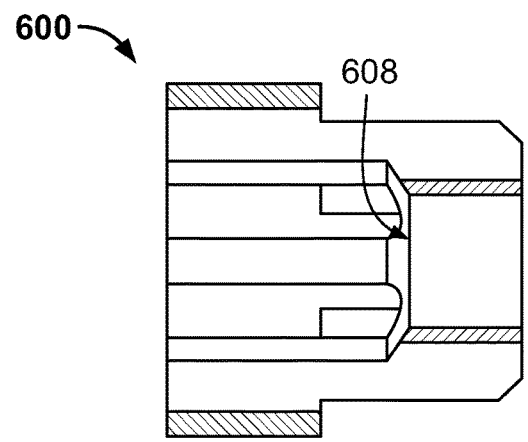
FIG. 6d is a side cross section view of the example diffuser insert shown in FIG. 6c, along line 6d-6d.

While six gas holes 526 are contemplated by the hexagonal hub 510 example of FIG. 5a, any number of gas holes 526 may be used (e.g. 1, 2, 3, 5, 8, 10, 12, etc.). The gas holes 526 may be positioned and/or oriented such that fluid flows radially through the gas holes 526 (e.g. approximately perpendicular to the longitudinal axis 302). The gas holes 526 may provide a flow path for fluid (e.g. shielding gas) to flow from the bore 511 within the gas diffuser 500 to the internal cavity space of the nozzle 348, when the gas diffuser 500 is positioned within the nozzle 348. Disclosed nozzles 348 have sufficient space within the nozzles 348 to enable the shielding gas coming out of the gas diffuser 500 to equalize and become laminar before the gas exits the nozzle 348. A large cross-sectional area of the gas holes 526 may help reduce the amount of back pressure in the assembled torch 16, which may reduce the chance of gas leaking through cracks/gaps/holes in the torch/cable assembly.

In some examples, the gas diffuser 500 may include a nose 506 positioned forward and/or distal of the hub 510 and the base 502. In the example of FIGS. 5a-5d, the nose 506 is approximately tubular, having a cylindrical profile with a bore 511 extending through its approximate middle. The example nose 506 is configured for attachment to the contact tip 356. In some examples, the nose 506 may include a taper 528 along the internal surface 514 of the gas diffuser 500, proximate to the front end of the gas diffuser 500. The taper 528 is configured to engage with a matching taper 528 of the contact tip 356, so as to retain the contact tip 356 within the nose 506. More particularly, the taper 528 of the nose 506 may decrease the diameter of the bore 511 when traveling inward in a direction proceeding from the front end 508 of the gas diffuser 500 towards the hub 510, such that the bore 511 has a larger diameter at the front end 508 of the gas diffuser 500, and a smaller diameter towards the middle of the gas diffuser 500, closer to the hub 510. An external surface 520 of the gas diffuser 500 has a taper 530 sloped in an opposite direction proximate to the taper 528 on the interior surface 514 of the gas diffuser 500. The taper 528 of the nose 506 of the gas diffuser 500, through its interaction with the mating taper 366 on the contact tip 326, may aid in the alignment (e.g., concentricity) of the contact tip 356 when it is installed (e.g., threaded) into the gas diffuser 500.

In some examples, the inner surface 514 of the nose 506 may also include threading 532 configured to engage matching threading on the contact tip 326, so as to couple the contact tip 356 to the gas diffuser 500. The threading 532 may be quick turn threading configured to allow for the contact tip 356 to be secured with less than one complete turn. The threading 532 and taper 528 cooperate to retain the contact tip 356 within the nose 506 of the gas diffuser 500.

In some examples, a diffuser insert 600, such as the diffuser insert 600 shown in FIGS. 6a-6d, may be used with the gas diffuser 500. The insert 600 may be used in examples where the gas diffuser 500 is used with a welding torch liner 1702 (such as shown in FIGS. 17a and 17b, for example). In such examples, the insert 600 may be positioned within the base 502 of the gas diffuser 500. The gas diffuser 500 may be configured internally to interact with the insert 600 such that a welding torch liner 1702 may not abut, reside within, nor be in any physical contact with a proximal axial end 368 of the contact tip 356. In certain examples, the contact tip 356 and the insert 600 may each have an outer diameter that is substantially similar to the other such that the axial flow of welding gas is not impeded. In some examples, the insert 600 may be integral with the gas diffuser 500.

Figure 14A:
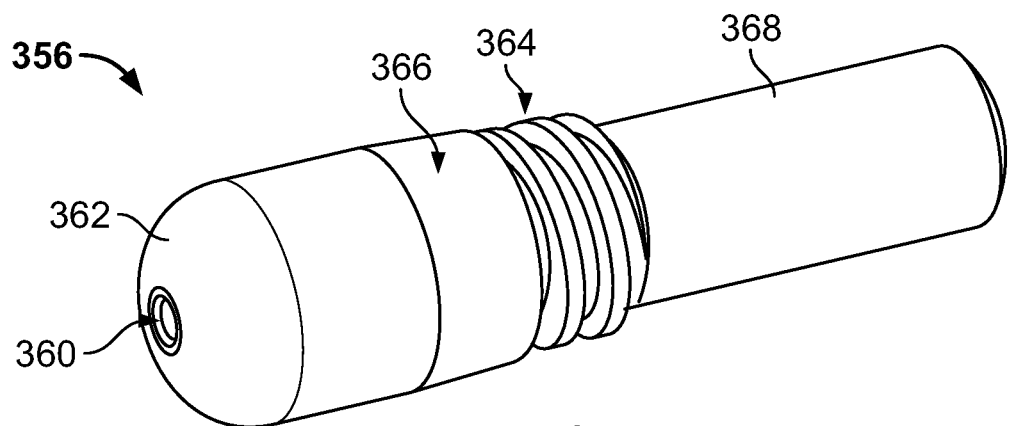
FIGS. 14a and 14b are perspective views of an example contact tip, in accordance with aspects of this disclosure.
Figure 14B:
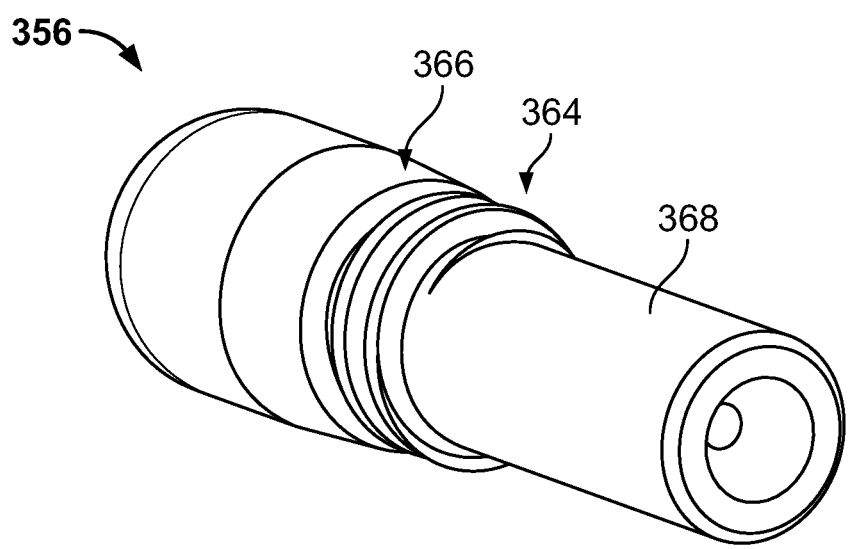
Figure 14C:
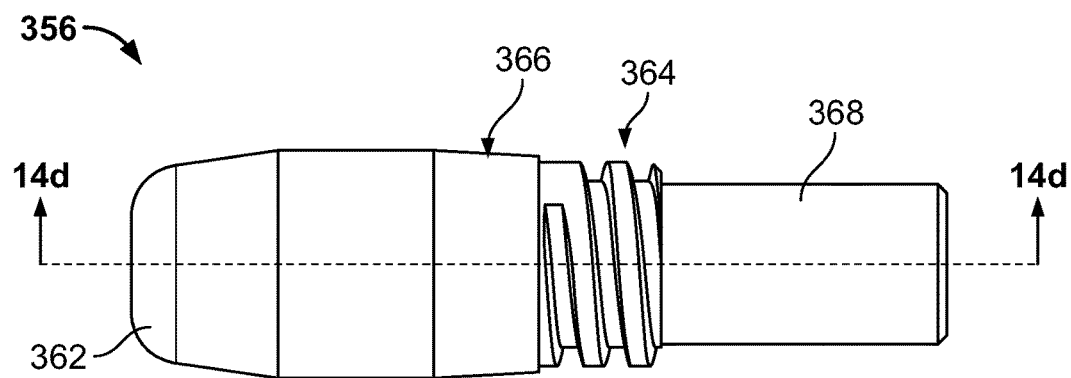
Figure 14D:
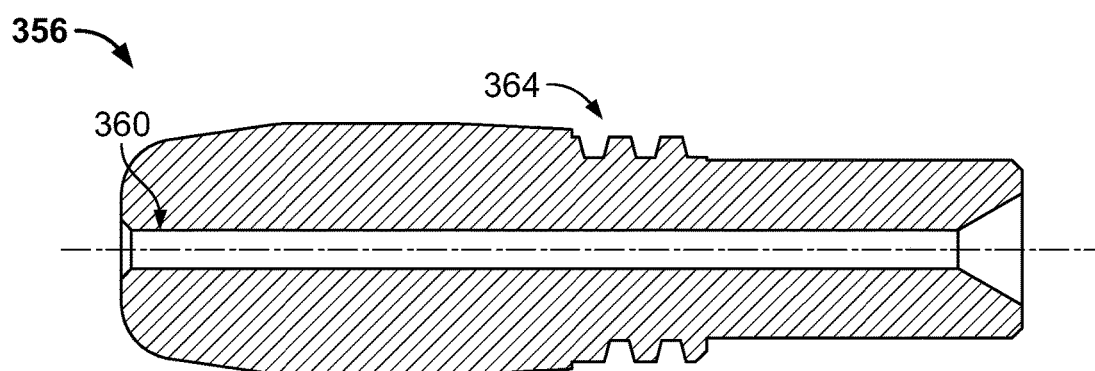
FIG. 14d is a side cross section view of the example contact tip shown in FIG. 14c, along line 14d-14d.

As illustrated, in certain examples, the insert 600 may include an external shoulder 602 configured to abut the taper 516 on the internal surface 514 of the base 502 of the gas diffuser 500, to hold the insert 600 in place with respect to the gas diffuser 500 when the gas diffuser 500 is coupled to the gooseneck 346. In addition, in certain examples, arms 604 of the insert 600 may facilitate the flow of welding gas through the welding torch 16 by having an outer diameter that generally matches (e.g., is substantially similar to) the outer diameter of the non-threaded proximal end portion 368 of the contact tip 356 illustrated in FIGS. 14a-14c. Furthermore, as illustrated, in certain examples, the insert 600 may include one or more conduits 606 that facilitate the flow of the welding gas from the interior of the gooseneck 346 into the internal bore of the gas diffuser 500. The insert 600 may further include a liner stop 608 configured to abut the liner 1702.

Figure 7A:
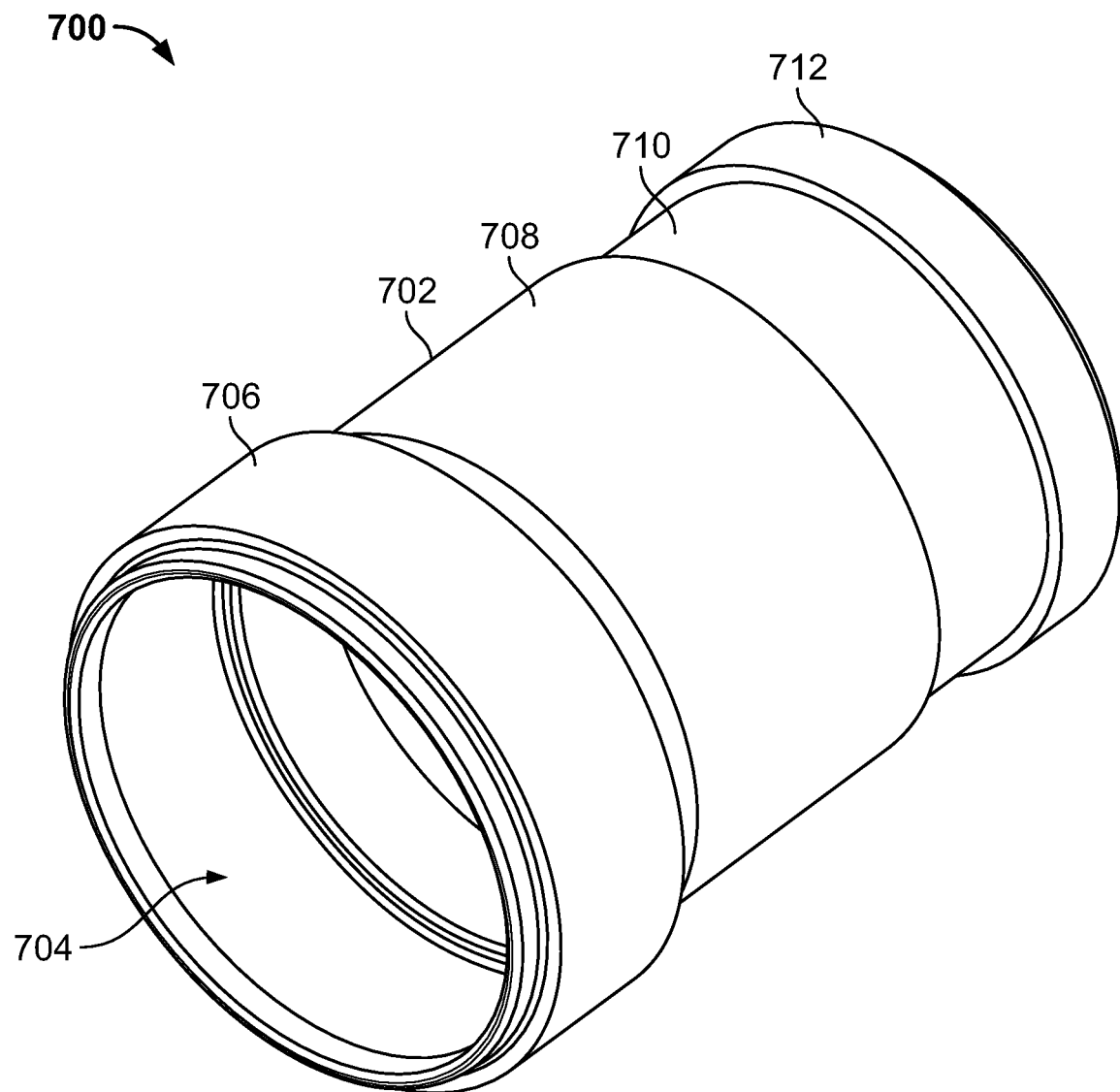
FIG. 7a is a perspective view of an example outer sleeve, in accordance with aspects of this disclosure.
Figure 7B:
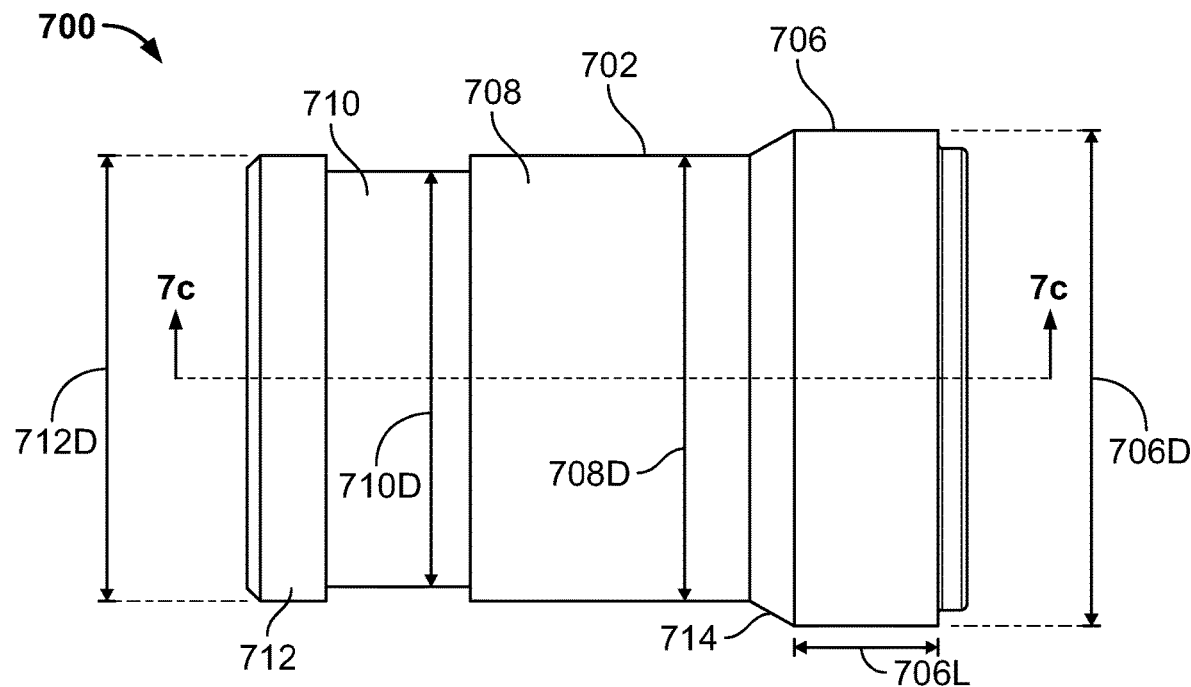
Figure 7C:
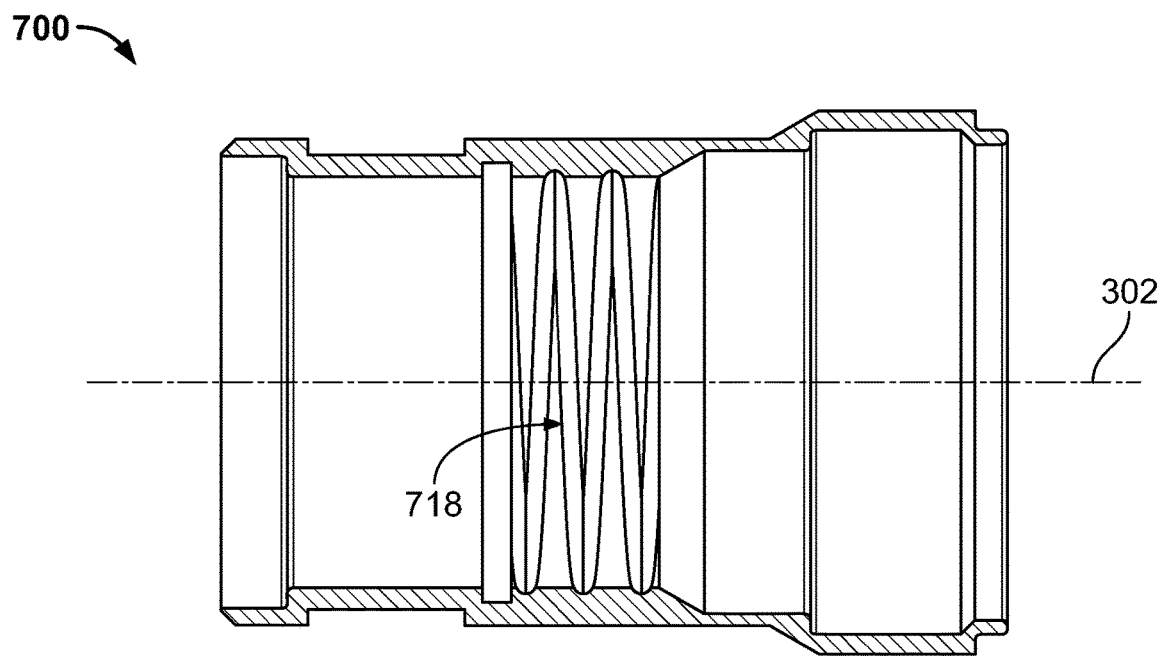
FIG. 7c is a side cross section of the example outer sleeve shown in FIG. 7b, along line 7c-7c.

FIGS. 7a-7c illustrate various views of an outer sleeve 700 of the gas diffuser assembly 400. The outer sleeve may be important for the durability and structural integrity of the diffuser assembly when impacts and shocks are applied. Thus, the outer sleeve 700 may be formed of a strong durable material, such as a metal material, like brass, copper, steel, aluminum, etc. In the examples shown in FIGS. 7a-7c, the outer sleeve 700 is generally tubular, with an exterior wall 702 surrounding a hollow interior 704. The exterior wall 702 of the outer sleeve 700 includes a rear shoulder 706, a main body 708, a ring groove 710, and a front rim 712. The outer diameter 706D of the outer sleeve 700 is largest proximate the rear shoulder 706. The outer diameter 710D is smallest in the area of the ring groove 710. The outer diameters 712D, 708D of the front rim 712 and main body 708 are approximately equal. Both outer diameters 712D, 708D are smaller than the outer diameter 706D of the rear shoulder 706 and larger than the outer diameter 710D of the ring groove 710.

The rear shoulder 706 is connected to the main body 708 through a taper 714. The taper 714 is configured to engage with a matching taper 322 of the nozzle 348. The taper 714 and shoulder 706 are configured to help center the nozzle 348 to the contact tip 356 and provide a seal to the nozzle assembly 300 to prevent the shielding gas from escaping out the back of the nozzle 348. When the gas diffuser assembly 400 is inserted in the nozzle 348, the shoulder 706 of the gas diffuser abuts against a rear portion of the nozzle 348, thereby preventing the nozzle 348 from moving axially towards the gooseneck 346.

In some examples, a ring groove 710 may be formed as a recess in the exterior wall 702 of the outer sleeve 700. In some examples, the ring groove 710 is sized and configured to hold a retaining ring 800. When the gas diffuser assembly 400 is inserted into the nozzle 348, protrusions 804 on the retaining ring 800 (sitting in the ring groove 710) are configured to snap fit into a groove of the nozzle 348. The ring groove 710 is positioned such a way as to provide a small amount of force towards the taper when the retaining ring is "snapped" into the groove of the nozzle 348. The retaining ring 800 and rear shoulder 706 cooperate to retain the nozzle 348 on the gas diffuser assembly 400 via the outer sleeve 700. In some examples, the retaining ring 800 may be replaced by a retaining clip or some other engagement mechanism.

By reconfiguring an axial length 706L of the shoulder 706 (while keeping the axial length of the body 702 between the ring groove 710 and the shoulder 706 the same), the position of the contact tip 356 with respect to the nozzle 348 (i.e. recessed, protruding, flush) can be changed without changing the nozzle 348. For instance, by increasing the axial length 706L of the shoulder 706, the outer sleeve 700 may be extended farther over the gas diffuser 500, such that the front rim 712, ring groove 710, and taper 714 all become closer to the front end 508 of the gas diffuser 500. Therefore, the nozzle 348 will connect to the outer sleeve 700 farther forward, while the contact tip 356 will connect to the gas diffuser 500 at the same position as before. Thus, the position of the nozzle 348 will move forward with respect to the contact tip 356, making it more likely the contact tip 356 will be recessed within the nozzle 348. By decreasing the axial length 706L of the shoulder 706, the outer sleeve 700 may extend a shorter distance over the gas diffuser 500, such that the front rim 712, ring groove 710, and taper 714 all become farther from the front end 508 of the gas diffuser 500. Therefore, the nozzle 348 will connect to the outer sleeve 700 farther backward, while the contact tip 356 will connect to the gas diffuser 500 at the same position as before. Thus, the position of the nozzle 348 will move backward with respect to the contact tip 356, making it more likely the contact tip 356 will stick-out or protrude past the front end 306 of the nozzle 348. Rather than changing the nozzle 348 to change the position of the contact tip 356 with respect to the nozzle 348 (i.e. recessed, protruding, flush), the gas diffuser assembly 400 may be changed instead.

In some examples, the axial length 706L of the shoulder 706 may be altered without keeping the axial length of the body 708 between the ring groove 710 and the shoulder 706 the same. In such an example, for instance, the nozzle 348 may be configured with grooves and/or other engagement features at different points along its length, in order to accommodate different type diffusers.

An interior wall 716 of the outer sleeve 700 may be formed with features configured to frictionally engage a material so as to resist movement of the material relative to the outer sleeve 700. In some examples, these features may include grooves 718 on an interior wall 716 of the outer sleeve 700. The grooves 718 may be configured to be complementary to the grooves 518 of the gas diffuser 500. Thus, the grooves 718 may also be formed helically using a clockwise pattern and/or a counter clockwise pattern, with radial grooves formed at each end of the helix. The grooves 718 may provide space into which the insulator 900 may be molded during an injection molding process or an over molding process, as discussed further below. Molding the insulator 900 into the grooves 718 and grooves 518 may improve the mechanical bond between the insulator 900, the gas diffuser 500, and the outer sleeve 700, and keep the whole gas diffuser assembly 400 together when torque and/or tension/compression is applied to the gas diffuser assembly 400. In some examples, knurling may be included instead of, or in addition to, the grooves 718, so as to provide a textured surface into which the insulator 900 material may be molded. In some examples, a cornered surface may be included instead of, or in addition to, knurling or grooves 718, such that the insulator 900 may be molded around the corners, which still might provide more of frictional engagement than molding the insulator 900 onto a smooth rounded surface. In some examples, vapor deposition, additive manufacturing, and/or other methods besides molding may be used to affix the insulator 900 to the outer sleeve 700.

Figure 8:
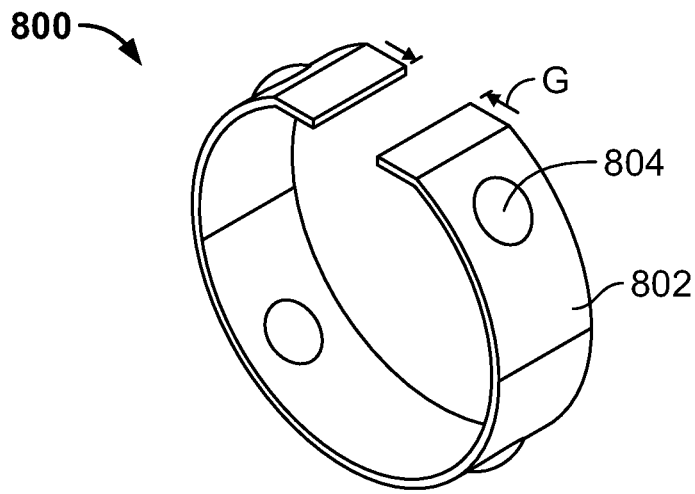
FIG. 8 is a perspective view of an example retaining ring, in accordance with aspects of this disclosure.

FIG. 8 illustrates an example retaining ring 800. In some examples, the retaining ring 800 may be sized to fit in the ring groove 710 of the outer sleeve 700. In some examples, the retaining ring 800 may be comprised of an approximately annular collar 802. While the retaining ring 800 is shown as being discontinuous in FIG. 8, with a gap G in its collar 802, in other examples the retaining ring 800 may be fully continuous, with no gap G, and/or with a clasp and/or other releasable connector that can connect and/or disconnect the two sides of the collar 802 across the gap G. In some examples, the retaining ring 800 may include protrusions 804 (and/or protuberances, bumps, humps, ridges, bulges, etc.) extending outward from the collar 802. The protrusions 804 may be approximately half spherical, or some other appropriate shape. The protrusions 804 may be approximately centered around the circumference of the retaining ring 800. The protrusions 804 may be configured to engage a complementary groove 328 on an internal surface of the nozzle 348 to couple the nozzle 348 to the gas diffuser assembly 400. Conveniently, the retaining ring 800 may give the user positive feedback (e.g. an audible "click") when the protrusions 804 engage the complementary groove 328 to indicate that the nozzle 348 is secured onto the gas diffuser assembly 400. While approximately four separate protrusions 804 are shown in the example of FIG. 8, in other examples the retaining ring 800 may have more or less protrusions 804.

Figure 9A:
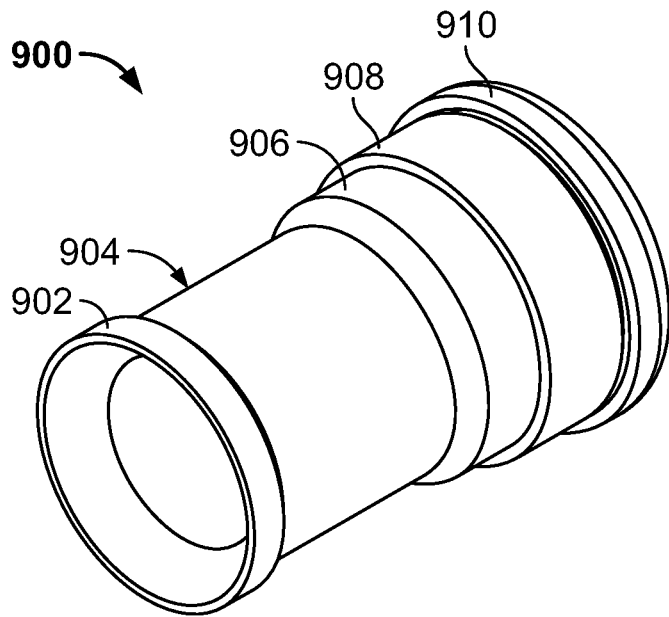
FIG. 9a is a perspective view of an example insulator, in accordance with aspects of this disclosure.
Figure 9B:
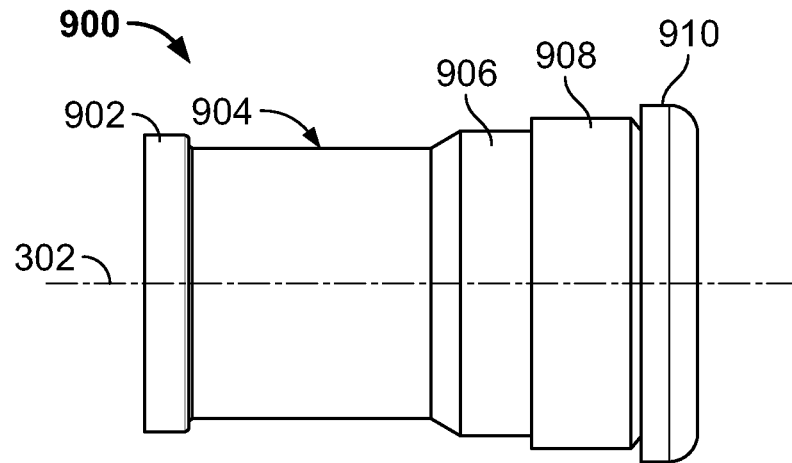

FIGS. 9a and 9b illustrate various views of an example insulator 900. The example insulator 900 is approximately tubular, with a hollow interior. The insulator 900 has a forward rim 902, a main body 904, a first shoulder 906, a second shoulder 908, and a rear rim 910. The shape and/or form of the insulator 900 approximately corresponds to the shape and/or form of the space and/or void between the gas diffuser 500 and the outer sleeve 700. During assembly of the gas diffuser assembly 400, the insulator 900 may be injection molded into the space between the gas diffuser 500 and the outer sleeve 700. During the injection molding process, the insulator 900 may be pushed into the space between the gas diffuser 500 and the outer sleeve, including the space in the grooves 518 of the gas diffuser 500 and the grooves 718 of the outer sleeve 700. Thus, while the insulator 900 is shown as being in this one particular form, the insulator 900 may take on other forms depending on the form of the gas diffuser 500, the outer sleeve 700, and the space in between. In some examples, the insulator 900 may be overmolded onto the gooseneck 346 instead of the gas diffuser 500. However, this variation may require users to replace the gooseneck 346 if the insulator 900 fails, which may occur before the gooseneck 346 itself requires replacement.

In some examples, the insulator 900 may be formed of an electrically insulating material configured to isolate the electrical current between the gas diffuser 500 and the nozzle 348, and/or between the gas diffuser 500 and the gooseneck 346. In some examples, the insulator 900 may also be configured to act as a medium to transfer heat energy from the nozzle 348 back into the gooseneck 346. Without this gateway to transfer heat energy, the nozzle 348 may become much hotter during operation. In some cases, fiberglass-resin materials that resist heat and have a high dielectric strength may be used as insulating material. In some cases, ceramic material may be used for the insulator. In some examples, the insulator 900 may be formed of a thermoset plastic. In some examples, the insulator 900 may be formed of a silicone based thermoset plastic. The thermoset plastic may enable the insulator 900 to maintain its strength during high heat operation (e.g. 450-500 degrees Celsius) and still have high impact strength. Once molded into the space between the gas diffuser 500 and the outer sleeve 700, the thermoset material may significantly strengthen the gas diffuser assembly 400 and the nozzle assembly 300.

Figure 10A:
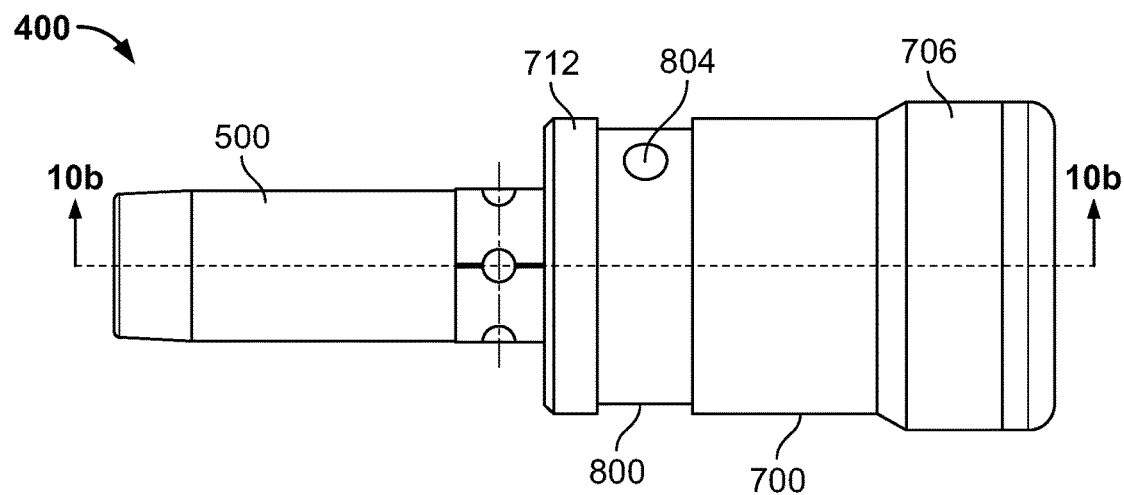
FIG. 10a is a side view of the assembled example gas diffuser assembly shown in FIG. 4.
Figure 10B:
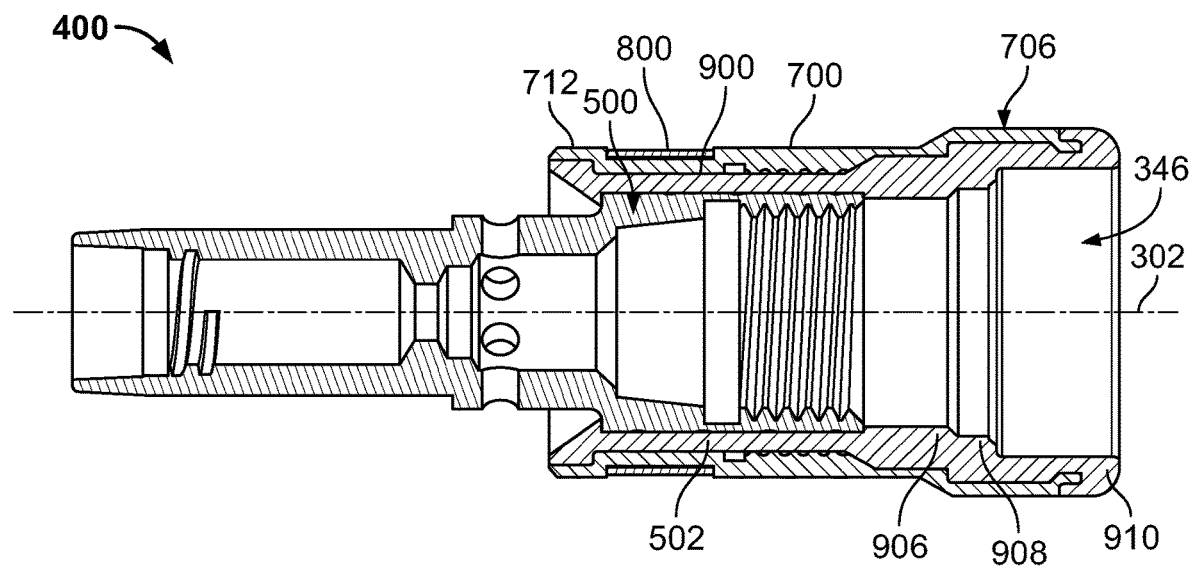
FIG. 10b is a side cross section of the example gas diffuser assembly shown in FIG. 10a, along the line 10b-10b.

FIGS. 10a and 10b illustrate various views of a fully assembled gas diffuser assembly 400. As shown, gas diffuser assembly 400 is assembled onto a portion of the gooseneck 346. In particular, the first shoulder 906, second shoulder, 908, and rear rim 910 of the insulator 900 are fit over the gooseneck 346. The outer sleeve 700 is fit over the insulator 900. The insulator 900 fills the space between the outer sleeve 700 and the gas diffuser 500. The retaining ring 800 sits in the ring groove 710 of the outer sleeve 700. The front rim 712 of the outer sleeve 700 extends over and past the body 502 of the gas diffuser 500. In some examples, the front rim 712 may extend farther past the body 502 of the gas diffuser 500, be flush with the end of the body 502 of the gas diffuser 500, or be retracted behind the body 502 of the gas diffuser 500, depending on the axial length 706L of the rear shoulder 706 of the outer sleeve 700. The insulator 900 may be molded all the way up to the front rim 712 of the outer sleeve 700, so as to prevent bridging of spatter from the gas diffuser 500 to the outer sleeve 700 and nozzle 348. When assembled into the nozzle 348, the shoulder 706 of the outer sleeve 700 and the protrusions 804 of the retaining ring 800 may act as engagement features configured to engage complementary engagement features of the nozzle 348 so as to couple the gas diffuser assembly 400 to the nozzle 348. FIG. 10c shows a partially exploded side view of the nozzle assembly 300, with the components of the gas diffuser assembly 400 assembled together.

FIG. 11 illustrates a side view of an alternative example gas diffuser assembly 1100. The alternative gas diffuser assembly 1100 is substantially identical to the gas diffuser assembly 400 except for its engagement features. In particular, the outer sleeve 1102 has screw threads 1104, rather than a ring groove 710 with a retaining ring 800 having protrusions 804. The screw threads 1104 are configured to engage complementary threads 1320 on a nozzle, such as the alternative example nozzle 1348 shown in FIG. 13b. The screw threads 1104 may be quick turn threads configured to allow for the gas diffuser assembly 1100 to be secured to the nozzle with less than one complete turn. While the screw threads 1104 shown in FIG. 11 are male threads, in some examples, the screw threads 1104 may be female threads.

Figure 12A:
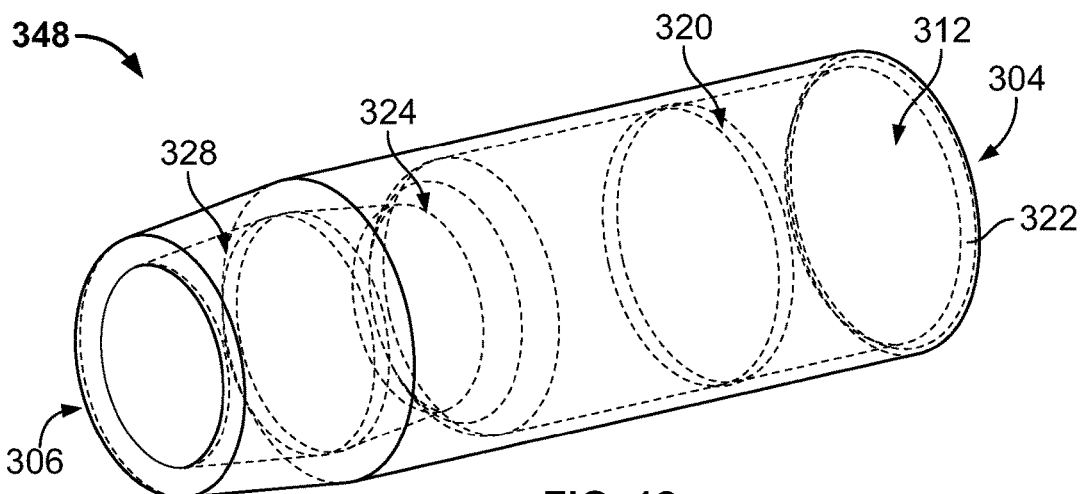
FIG. 12a is a perspective view of an example nozzle.
Figure 12B:
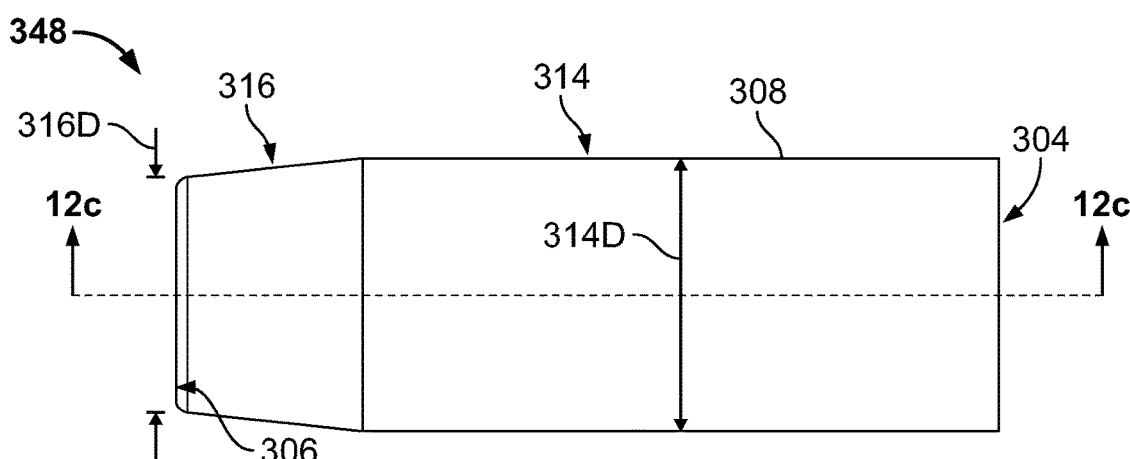
Figure 12C:
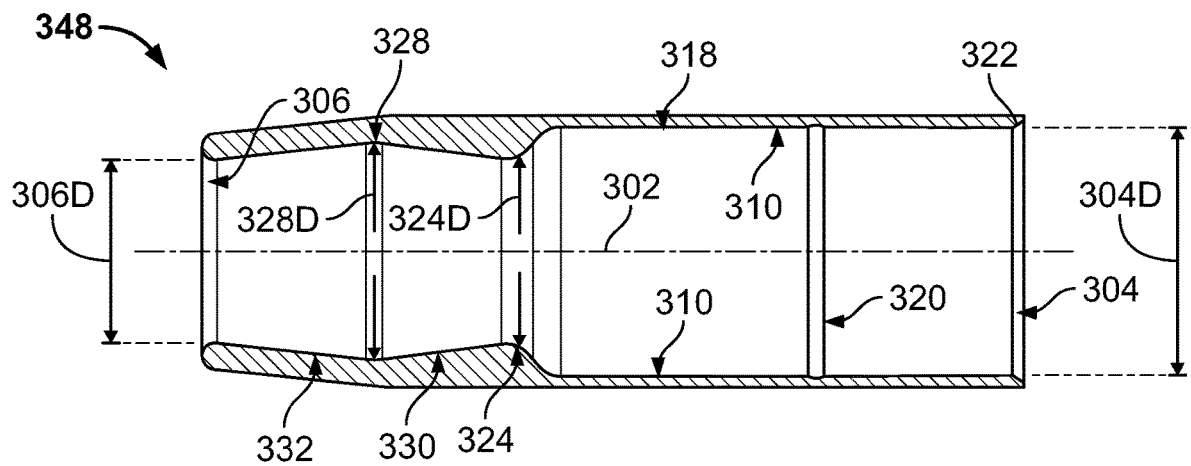
FIG. 12c is a side cross section view of the example nozzle shown in FIG. 12b, along line 12c-12c.

FIGS. 12a-12c show an example nozzle 348. The nozzle 348 provides a method for directing shielding gas down onto the weld arc to protect it from contamination (oxidization/porosity in the weld). The nozzle 348 creates a flow of shielding gas that is generally laminar, as turbulent air flow may increase the risk of weld pool contamination. In some examples, the nozzle 348 may be configured with sufficient space within the interior of the nozzle 348 to allow the shielding gas coming out of the gas diffuser assembly 400 to equalize and become laminar before it exits the front bore of the nozzle 348. In some examples, the nozzle 348 may be a one-piece design, rather than the three-piece design of conventional welding torches. Thus, disclosed examples may increase the durability of the nozzle 348 and decrease the assembly time.

In some examples, the nozzle 348 may have a rear end 304, a front end 306, an external surface 308, and an internal surface 310. In the example of FIGS. 12a-12c, the nozzle 348 includes a bore 312 extending through the nozzle 348 along an axis 302 of the nozzle 348. The external surface 308 of the nozzle 348 is generally cylindrical and/or tubular along an external body 314 of the nozzle 348, such that an outer diameter 314D of external body 314 is approximately the same along the axial length of the nozzle 348. The external body 314 of the nozzle 348 extends from the rear end 304 of the nozzle 348 to a point more than halfway to the front end 306 of the nozzle 348. The nozzle 348 further includes a tapering portion 316 extending from the endpoint of the external body 314 to the front end 306. The tapering portion 316 is sloped such that the outer diameter 316D at the front end 306 of the nozzle 348 is less than the outer diameter 314D of the nozzle 348 at the external body 308.

The bore 312 of the nozzle 348 is at its largest at the rear end 304 of the nozzle. The bore 312 is smaller at a front end 306 of the nozzle 348, such that the internal diameter 304D at the rear end 304 of the nozzle 348 is larger than the internal diameter 306D at the front end 306D of the nozzle. A shoulder engaging taper 322 exists at the rear end 304 of the nozzle 348, connecting the internal surface 310 of the nozzle 348 to the external surface 308 of the nozzle 348. The taper 322 has an angled slope configured to match with and engage the angled slope of the taper 714 of the outer sleeve 700 of the gas diffuser assembly 400.

The internal surface 310 of the nozzle 348 includes an internal body portion 318 that extends from a rear end 304 of the nozzle 348. The internal surface 310 of the nozzle at the internal body portion 318 extends approximately parallel to the external surface 308. In some examples, the internal body portion 318 includes an annular groove 320 configured to engage protrusions 804 of the retaining ring 800. The distance between the rear end 304 of the nozzle 348 and the annular groove 320 may be approximately equal to the axial length of the main body 708 of the outer sleeve 700, from the taper 714 to the ring groove 710. In some examples, the nozzle 348 may include a plurality of annular grooves 320 spaced at different distances, so as to accommodate gas diffuser assemblies 400 having different axial lengths of the main body 708 of the outer sleeve 700, from the taper 714 to the ring groove 710. The annular groove 320 and shoulder engaging taper 322 are configured to engage matching features of the gas diffuser assembly (i.e. protrusions 804 of retaining ring 800 and taper 714 of shoulder 706 of outer sleeve 700) so as to couple the nozzle 348 to the gas diffuser assembly 400.

At a narrowing neck 324 of the nozzle 348, the bore 304 and/or internal surface 310 of the nozzle 348 narrows to a diameter 324D that is less than the diameter 304D at the rear end 304 of the nozzle 348. The narrowing neck 324 acts limits the amount of space in the nozzle 348 for spatter to travel. Thus, the narrowing neck 324 helps to prevent spatter from traveling into the body 318 of the nozzle 348e, where the gas holes 526 of the gas diffuser assembly 400 may be positioned. Reducing the amount of spatter capable of reaching beyond the narrowing neck 324 to the gas holes 526, reduces the amount of spatter capable of clogging and/or obstructing the gas holes 526. It is desirable to keep the gas holes 526 free from spatter as clogged gas holes may prevent shielding gas from properly shielding the weld pool from contamination, thereby reducing weld quality. In some examples, the inner diameter 324D of the narrowing neck 324 at its narrowest point is approximately equal to the inner diameter of the front end 306D of the nozzle 348. This may help ensure that a reamer that can enter through the front end 306 of the nozzle to clean the nozzle will be able to proceed past the narrowing neck 324 to clean spatter from in and/or around the gas holes 526. In other examples, the inner diameter 324D of the narrowing neck 324 at its narrowest point may be larger or smaller than the inner diameter of the front end 306D of the nozzle 348.

The inner surface 310 of the nozzle 348 includes a spatter deflector 328 between the front end 306 of the nozzle 348 and the narrowing neck 324. The spatter deflector 328 comprises two sloped sections 330, 332. A first sloped section 330 slopes outward toward the external surface 314 from the narrowing neck 324. The second sloped section 332 slopes inward toward the central axis 302 from the first sloped section 330 to the front end 306 of the nozzle 348. In some examples the first sloped section 330 may have a smaller length than the second sloped section 332. For example, the first sloped section 330 may have a length between 0.25 and 0.5 inches (such as 0.438 inches, for example). The second sloped section 332 may have a length between 0.4 inches and 0.75 inches (such as 0.548 inches, for example). In some examples, the inner diameter 328D at the widest point of the spatter deflector 328 is larger than the inner diameter 306D of the nozzle 348 at the front end 306, and the inner diameter 324D of the nozzle 348 at the narrowing neck 324D. In some examples, the widest point of the spatter deflector 328, may correspond to the point where the external surface 308 transitions from the external body portion 314 to the tapering portion 316.

The wider diameter 324D of the spatter deflector 324 provides more space for shielding gas to slow down before exiting the nozzle 348, so as to ensure laminar flow. The wider diameter 324D also provides more space for the spatter deflector 324 to trap spatter within the nozzle 348. The second sloped section 332 expands the volume within the nozzle 348 to accept more spatter. The first sloped section 322 then restricts the volume within the nozzle to deflect and/or trap the spatter that has entered the nozzle 348. Deflected spatter may lose enough of its energy to prevent adherence to the inside of the nozzle 348. Alternatively, deflected spatter may be deflected out of the nozzle 348 or onto a surface of the nozzle that is less critical and/or relatively easily cleaned. Once the gas diffuser assembly 400 and contact tip 356 are assembled into the nozzle, the contact tip 356 will take up some of the space inside the nozzle, thereby also helping to deflect spatter. The space between the narrowing neck 324 and the gas diffuser assembly 400 and/or contact tip 356 within the nozzle 348 may be small enough to limit spatter entering past the narrowing neck 324, and wide enough to ensure laminar gas flow. With such a small space at the narrowing neck 324, there may be limited trajectories from the weld pool through the narrowing neck 324 for spatter to follow. Additionally, the limited amount of spatter that achieves such a trajectory would still have to have sufficient velocity to propel it past the narrowing neck 324. Thus, the spatter deflector 324 may help to block, deflect, and/or trap spatter within the nozzle before it can proceed past the narrowing neck 328 into a portion of the nozzle 348 proximate the gas holes 526, where the spatter could have a larger detrimental effect on performance.

Figure 13A:
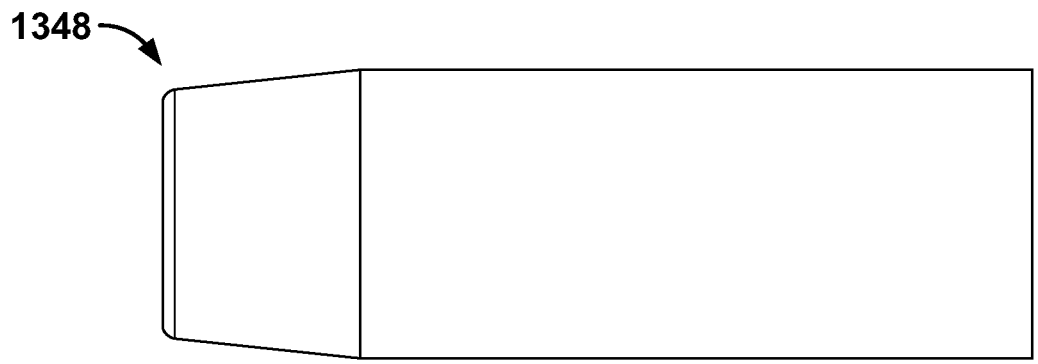
FIG. 13a is a side view of another example nozzle, in accordance with aspects of this disclosure.
Figure 13B:
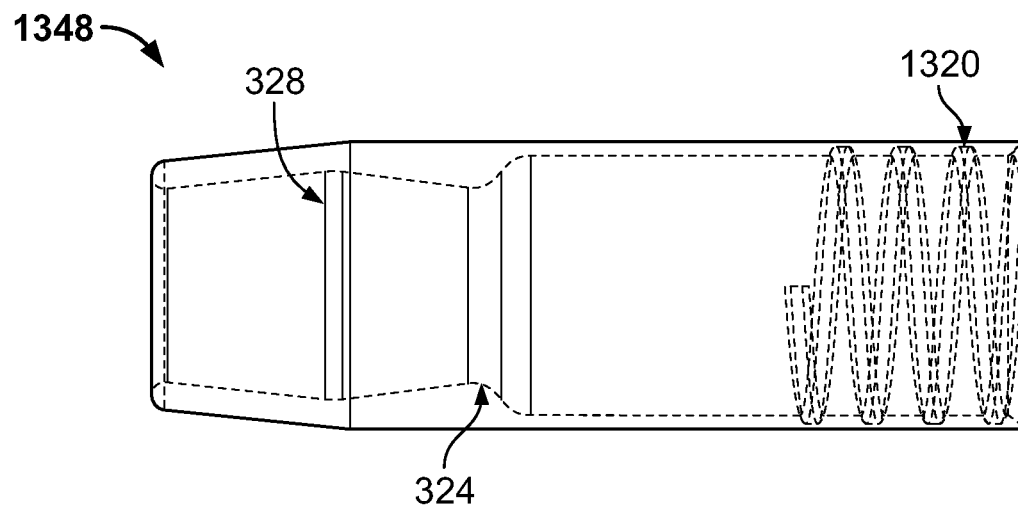

FIGS. 13a and 13b show various views of another example nozzle 1348. The example nozzle 1348 is similar to the nozzle 348 in most respects. The nozzle 1348 includes a spatter deflector 328 and a narrowing neck 324, as well as most other features of the nozzle 348. However, the nozzle 1348 includes different engagement features for coupling the nozzle 1348 to a diffuser assembly. More particularly, rather than an annular groove 320 to engage protrusions 804 on the gas diffuser assembly 400, the nozzle 1348 includes a screw thread groove 1320 configured to engage complementary screw threads 1104 (e.g. screw thread protrusions) on a gas diffuser assembly 1100 (such as the gas diffuser assembly 1100 shown in FIG. 11).

FIGS. 14a-14d show various views of a contact tip 356. The contact tip 356 may be similar to the contact tip described in U.S. Patent Publication 2017/0165780 (Centner) which is owned by the assignee of this application, and is incorporated herein by reference. In some examples, the contact tip 356 may include a bore 360 extending through an approximate middle of the contact tip 356. The contact tip 356 may include a rounded front face 362, which may reduce spatter adhesion. In some examples, the contact tip 356 includes external threading 364 configured to mate with internal threading 532 of the gas diffuser 500 so as to couple the contact tip 356 to the gas diffuser 500. The threading 364 may be disposed near a center portion of the contact tip 356. A tapered outer surface 366 of the contact tip 356 may be configured to abut a mating tapered inner surface 528 of the gas diffuser 500 when the contact tip 356 is threaded into the gas diffuser 500. The tapered outer surface 366 may be disposed near a center portion of the contact tip 356. A non-threaded proximal end portion 368 of the contact tip 356 may be referred to as a "cooling tail." The gas diffuser 500 is configured such that when the contact tip 356 is installed within the gas diffuser 500, the non-threaded proximal end portion 368 of the contact tip 356 (the "cooling tail") protrudes into the welding gas stream and, as such, helps cool the contact tip 356 through convection during use, thereby improving the performance and/or service life of the contact tip 356.

Figure 15A:
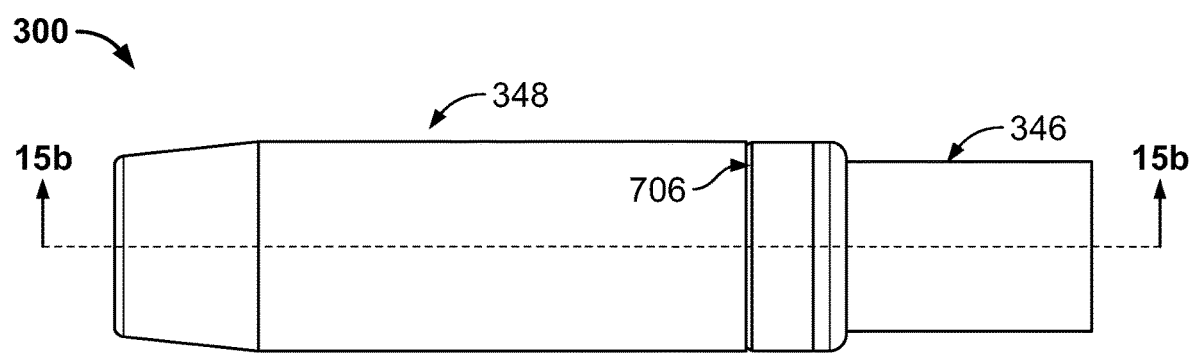
FIG. 15a is a side view of a fully assembled nozzle assembly, in accordance with aspects of this disclosure.
Figure 15B:
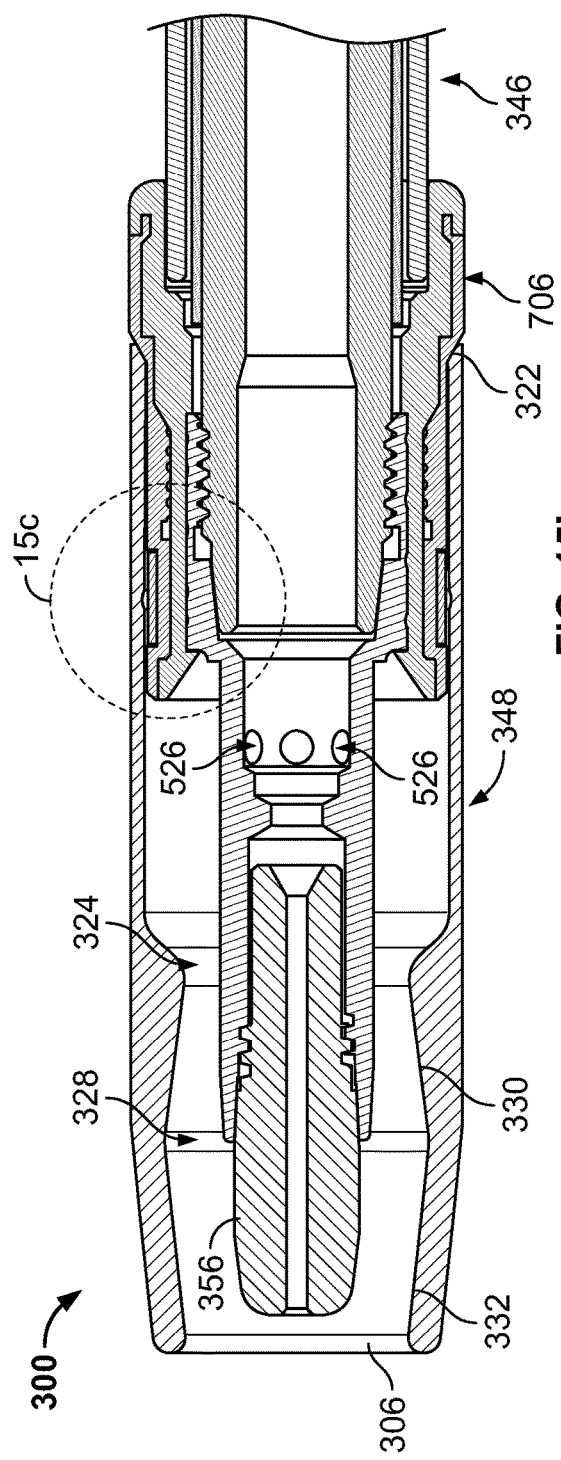
FIG. 15b is a side cross section of the fully assembled nozzle assembly of FIG. 15a, along line 15b-15b.
Figure 15C:
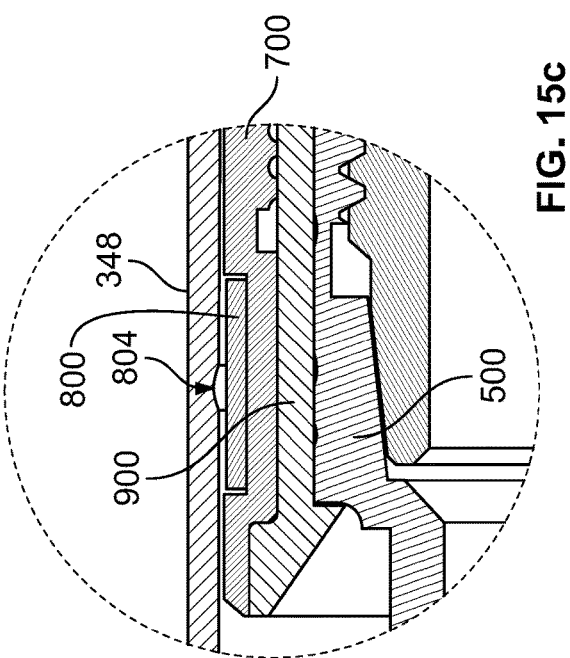
FIG. 15c is an expanded side cross section view of a portion of the fully assembled nozzle assembly of FIG. 15b.

FIGS. 15a-15c show an example fully assembled nozzle assembly 300. Fully assembled, the contact tip 356 is coupled to the gas diffuser assembly 500 within the nozzle 348, and the gas diffuser assembly 500 is coupled to gooseneck 346. The gas diffuser assembly 400 provides an electrically conductive pathway from the gooseneck 346 to the contact tip 356. The taper 714 and the protrusions 804 of the gas diffuser assembly 400 engage the nozzle 348. In the example shown in FIG. 15b, the contact tip 356 is recessed behind a front end 306 of the nozzle 348. However, this may be changed by changing the axial length 706L of the shoulder 706 of the gas diffuser assembly 400. By increasing the axial length 706L of the shoulder 706, the positions of the taper 714 and the protrusions 804 with respect to the gas diffuser 500 and the contact tip 356 may be changed, such that the contact tip 356 may be made flush with the front end 306 of the nozzle 348, or may be made to stick-out past the front end 306 of the nozzle 348.

Figure 16:
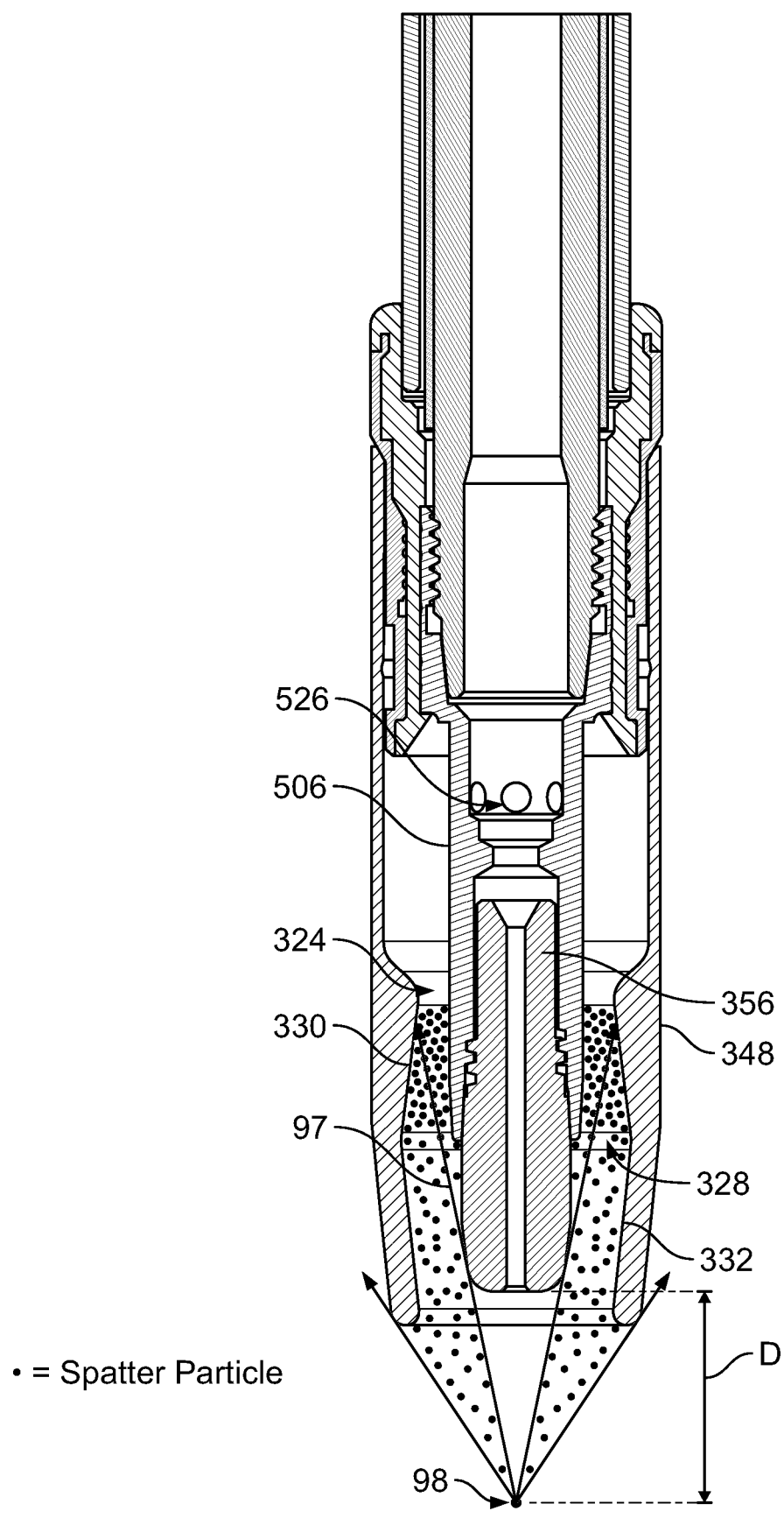
FIG. 16 is a cross sectional view of an example nozzle assembly, illustrating weld spatter within the nozzle assembly, in accordance with aspects of this disclosure.

FIG. 16 shows a cross sectional view of the fully assembled nozzle assembly 300, illustrating the behavior of the spatter deflector 328 with respect to weld spatter. As shown in the figure, the gas holes 526 of the gas diffuser assembly 400 are positioned behind the narrowing neck 324 of the nozzle 348, such that the spatter deflector 328 and narrowing neck 324 will be able to minimize the amount of spatter that might obstruct the gas holes 526. A weld point 98 where a weld pool is created by the arc 24 is spaced from the contact tip 356 by a distance D. The distance D may, for example, be approximately 15 millimeters (or approximately 0.591 inches). Spatter is created at the weld point 98. The spatter may have potential example trajectories 97. Because of the contact tip 356 and the structure of the nozzle 348, none of the example trajectories 97 will directly propel the spatter past the narrowing neck 324 of the nozzle 348. Spatter following the trajectories 97 will either be propelled away from the nozzle 348 or will be propelled on a collision course with the contact tip 356 or the spatter deflector 328 of the nozzle 348. If the weld point were farther from the contact tip 356, there may be some example trajectories 97 that spatter could follow through the narrowing neck 324. However, the farther away the weld point 98 is from the nozzle 348, the more energy the spatter will need to achieve sufficient velocity to propel the spatter past the narrowing neck 324, which may reduce the energy of the spatter such that there is little heat energy, which may cause the spatter to have a low adhesion force. The majority of the spatter that makes it to the spatter deflector 328 will either be deflected away or trapped by the spatter deflector 328. Deflected spatter will lose both kinetic energy (i.e. velocity) and thermal energy, and will have less of a chance of retaining enough energy to travel past the narrowing neck 324 to obstruct the gas holes 526. Spatter that accumulates in the nozzle 348 proximate the spatter deflector 328 is easier to clean with a torch cleaner (e.g. a reamer), since the spatter deflector 328 is close to the front end 306 of the nozzle, with minimal depth within the nozzle. The majority of the spatter may accumulate between the first sloped section 330 of the spatter deflector 328 and the nose 506 of the gas diffuser 500.

Figure 21A:
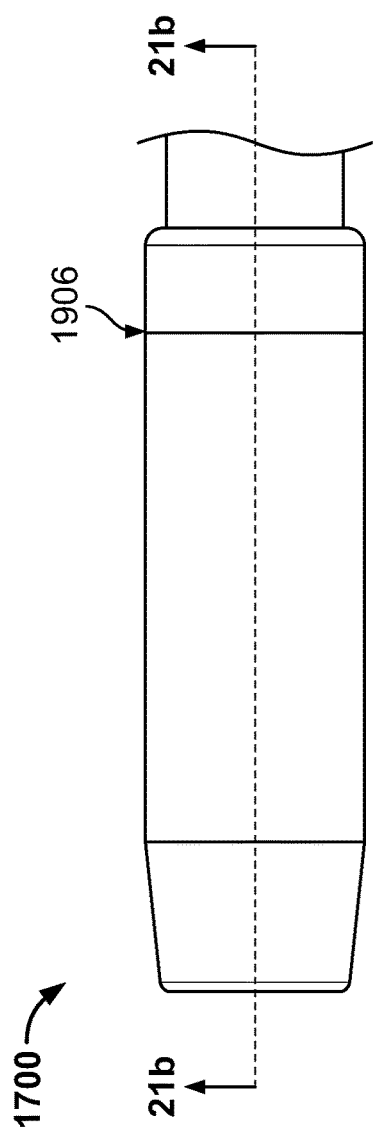
FIG. 21a is a side view of an assembled example nozzle assembly, in accordance with aspects of this disclosure.
Figure 21B:
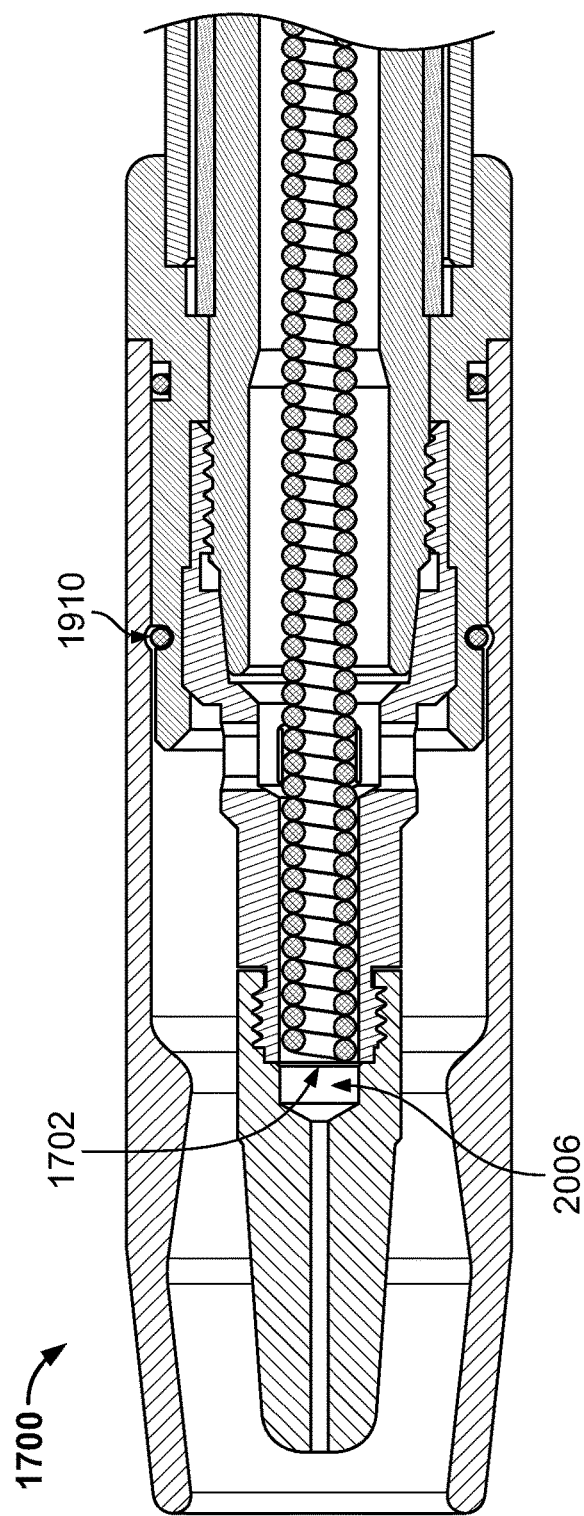
FIG. 21b is a side cross section view of the assembled example nozzle assembly shown in FIG. 21a, along line 21b-21b.

FIGS. 17a and 17b show various views of another example nozzle assembly 1700. The nozzle assembly 1700 is similar to the nozzle assembly 300. In some examples, the nozzle assembly 1700 includes a nozzle 348, similar to the nozzle 348 of the nozzle assembly 300. In some examples, the nozzle 348 may be replaced by the nozzle 1348, discussed above. In some examples, the nozzle assembly 1700 may include a contact tip 2000, and a gas diffuser assembly 1800 that are different from the contact tip 356 and gas diffuser assembly 400 discussed above. For example, the gas diffuser assembly 1800 may have no outer sleeve 700. The nozzle assembly 1700 may also be adapted to work with a liner 1702. The liner 1702 may be trimmed flush with the end of the gas diffuser assembly 1800 to eliminate measuring of the liner 1702. FIGS. 21a and 21b show assembled views of the nozzle assembly 1700. When assembled, the components of the nozzle assembly 1700 share a longitudinal axis 302 that extends through an approximate middle of the nozzle assembly 1700.

Figure 18B:
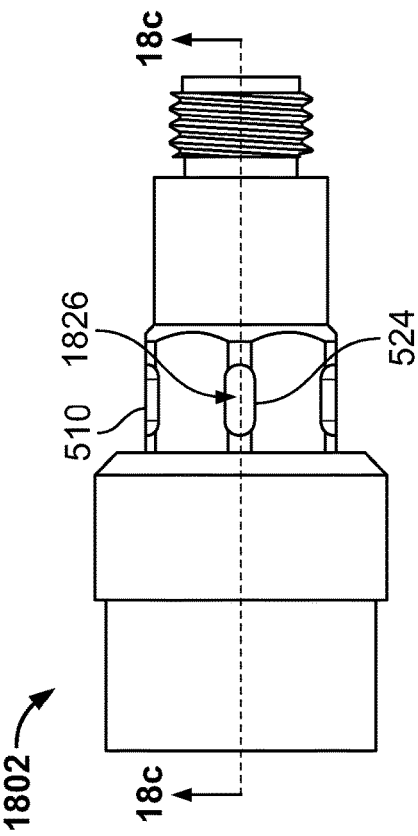
Figure 18A:
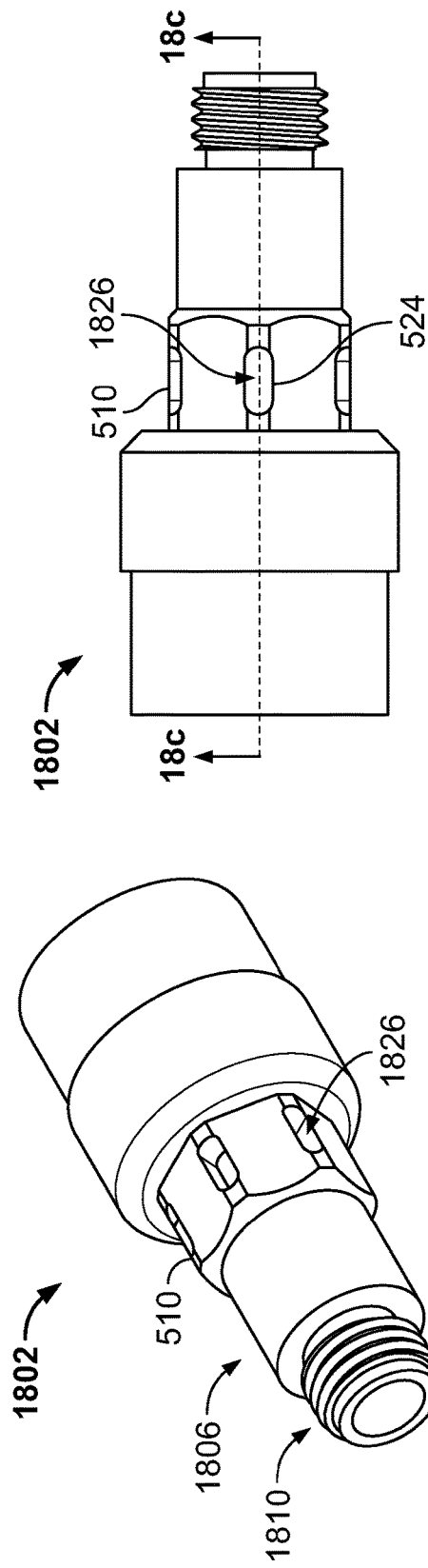
FIG. 18a is a perspective view of another example gas diffuser, in accordance with aspects of this disclosure.
Figure 18C:
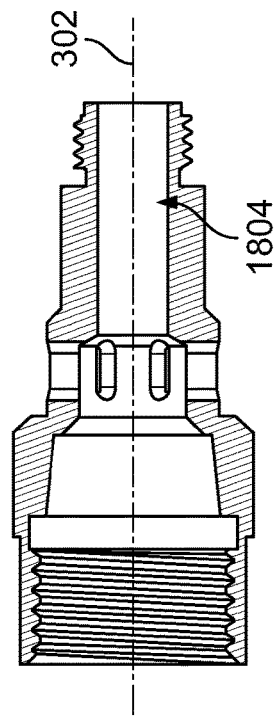
FIG. 18c is a side cross section view of the example gas diffuser shown in FIG. 18b, along line 18c-18c.

FIGS. 18a-18c show various views of the gas diffuser 1802. The gas diffuser 1802 is similar to the gas diffuser 400. In some examples, the gas diffuser 1800 may include gas holes 1826 positioned on the edges 524 of polygon hub 510. In some examples, the gas holes 526 are more oval than the circular holes of the gas diffuser 1802. The increased cross-sectional area of the oval gas holes 526 may help reduce the amount of back pressure in the assembled torch, which may reduce the chance of gas leaking through cracks/gaps/holes in the torch/cable assembly. The gas diffuser 1802 also includes a nose 1806 with screw threads 1810 configured to engage matching threads on the contact tip 2000. However, the screw threads 1810 are on an external surface of the gas diffuser 1802, rather than an internal surface. In some examples, the gas diffuser 1802 may include within the nose 1806 a liner guide 1804 sized according to the outer diameter of the liner 1702. The liner guide 1804 may be configured to keep the liner 1702 concentric to the contact tip 2000, to help with feedability.

Figure 19E:
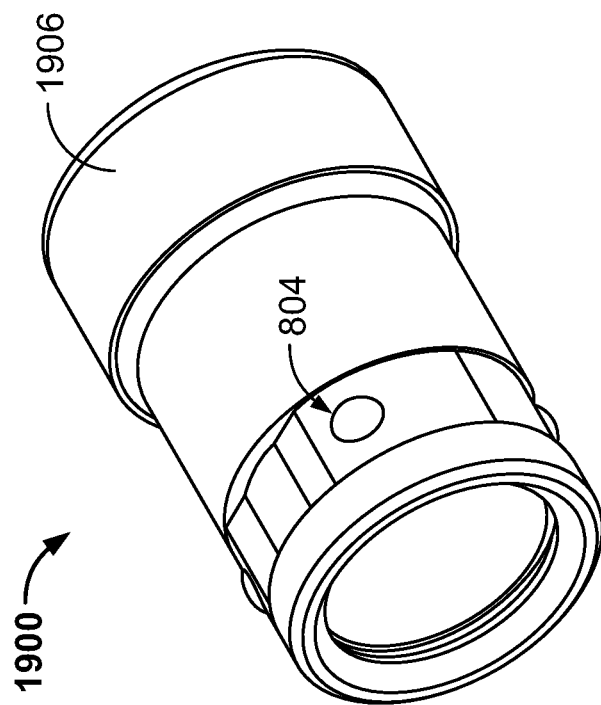
FIGS. 19d and 19e are perspective views of other example insulators, in accordance with aspects of this disclosure.
Figure 19D:
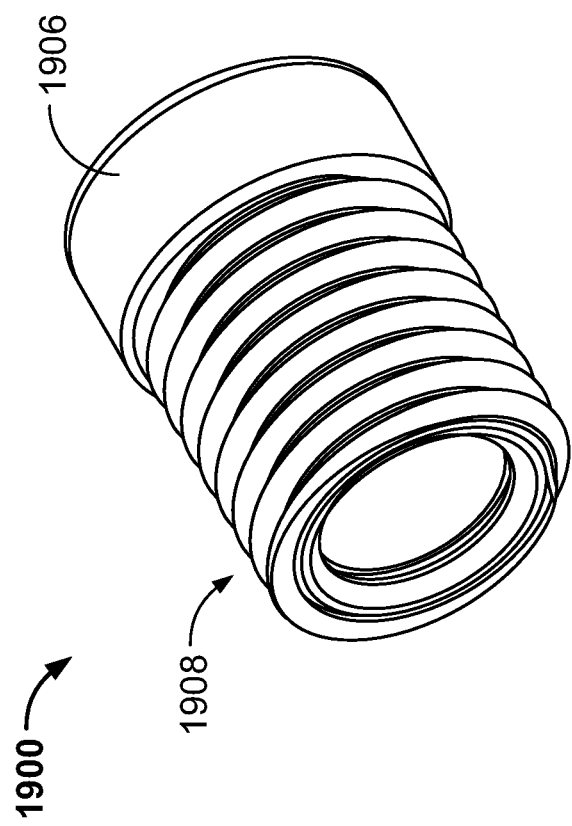

FIGS. 19a-19c show various views of an insulator 1900. In some examples, the insulator 1900 functions as the electrical insulator between the gas diffuser 1802 and the nozzle 348 and/or between the gas diffuser 1802 and the gooseneck 346. The insulator 1900 may also act as a medium to transfer heat energy from the nozzle 348 back into the gooseneck 346. In other examples, the insulator 1900 is overmolded onto the gas diffuser 1802 to create one part to improve durability. The insulator 1900 may include features to couple the nozzle 348 to the gas diffuser assembly 1800. For example, as shown in FIG. 19e, the insulator 1900 may include a groove 1902 configured to fit a fastening feature, such as a snap ring 1910, an O-ring 1912, a retaining ring 800, or the like. The fastening feature may be fitted onto the insulator 1900 through the groove 1902 and mate with a complementary feature of the nozzle 346, such as an annular groove 320, to couple the nozzle 346 to the gas diffuser assembly 1800. In some examples, the insulator 1900 may include a second groove 1904 to fit a retaining ring 800, fastener, O-ring, and/or a combination of retaining mechanisms. In some examples, such as shown in FIG. 19d, the insulator 1900 may additionally, or alternatively, include screw threads 1908 configured to engage matching/complementary threads 1320 in the nozzle 1348, such as shown in FIG. 13b, for example. The insulator 1900 may also include a shoulder 1906 having an axial shoulder length 1906L configured to abut the nozzle 348, similar to the shoulder 706 of the outer sleeve 700.

Figure 22C:
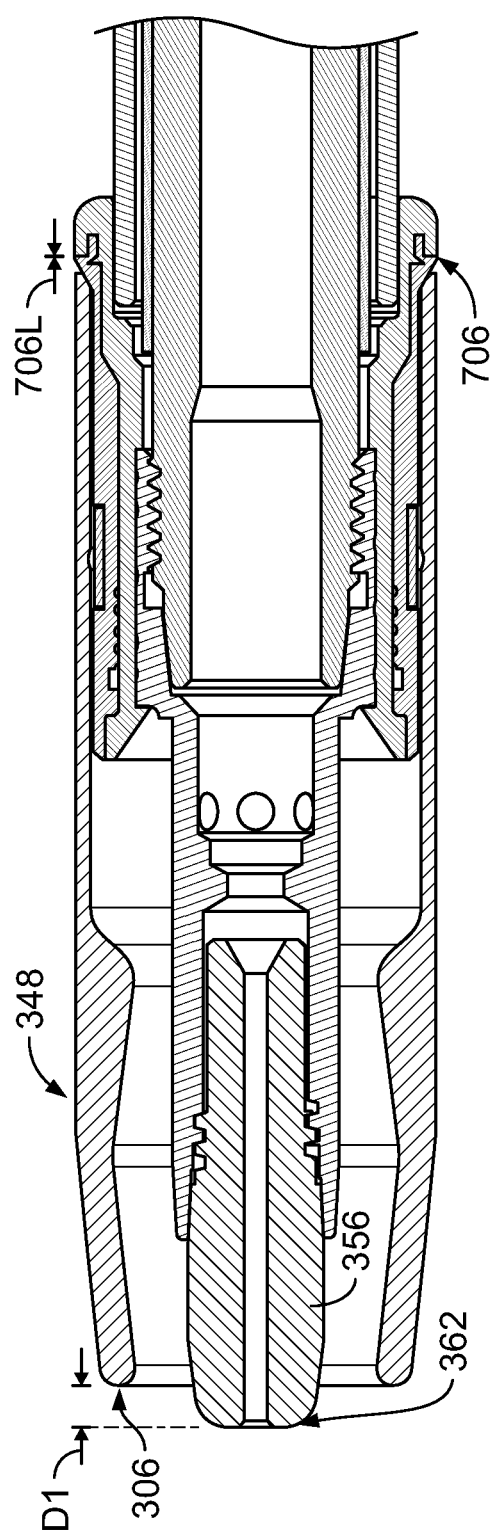

FIGS. 20a-20c show various views of an example contact tip 2000. The contact tip 2000 has a rounded front face 2002 to reduce spatter adhesion. The contact tip 2000 has a hexagon profile at its rear face 2004, though other polygon profiles may be used rather than a hexagon profile. The contact tip 2000 has a bore 2008 extending through an approximate middle of the contact tip 2000. The bore 2008 is configured to fit and feed wire 18. The contact tip 2000 has a liner recess 2006 at the rear of the contact tip 2000. The liner recess 2006 may allow the liner 1702 to move within the liner guide 1804 without interfering with the contact tip 2000. This feature may increase the feedability of the wire 18 as the liner 1702 can move freely and will not bind up when the robot is articulated FIGS. 22a-22c show various views of an example nozzle assembly 300 having gas diffuser assemblies 400 with different outer sleeves 700. Each outer sleeve 700 has a shoulder 706 with a different axial length 706L. The distance D1 between the front face 362 of the contact tip 356 and the front end 306 of the nozzle 348 vary in proportion to the varying axial lengths 706L of the shoulders 706. Thus, the change in the distance D1 between the front face 362 of the contact tip 356 and the front end 306 of the nozzle 348 in FIGS. 22a-22c may be approximately equal to the change in the axial length 706L of the shoulder 706 of the outer sleeve 700. The distance D1 determines whether the contact tip 356 is retracted within the nozzle 348 (as in FIG. 22a), flush with the nozzle 348 (as in FIG. 22b), or sticking out past the nozzle 348 (as in FIG. 22c).

FIG. 23 shows an example method 2300 of adjusting a position of the contact tip 356 relative to the nozzle 348 (e.g. stick out). Stick out is conventionally adjusted by changing the nozzle 348. A different length nozzle 348 may change how far the contact tip 356 protrudes past, or is recessed behind, the front end 306 of the nozzle 348. However, this may require a variety of different length nozzles 348. The method of FIG. 23 contemplates changing the gas diffuser assembly 400/1800 to achieve a variety of different desired nozzle 348/1348 versus contact tip 356/2000 positions, while keeping the same nozzle 348/1348. While the method may reference the specific torch 16 components, it should be understood that the method may use any combination of applicable torch 16 components discussed above.

By using different gas diffuser assemblies 400 with different outer sleeves 706 having shoulders 706 with different axial lengths 706L, the position of the contact tip 356 relative to the nozzle 348 (e.g. stick out) maybe adjusted without having to use different nozzles 348. In step 2302 of the method, an arc welding torch 16 is provided. The torch 16 may have any of the above described nozzle assemblies 300/1700 and/or gas diffuser assemblies 400/1800, and/or their components. In step 2304, a desired distance between the front face 362 of the contact tip 356 and the front end 306 of the nozzle 348 is determined. At step 2306, a determination is made whether the actual distance D1 between the front face 362 of the contact tip 356 and the front end 306 of the nozzle 348 (e.g. contact tip stick out) is sufficient. This may involve measurement of the actual distance D1 as compared to the desired distance and/or a determination whether the difference is within a certain negligible and/or allowable deviation. The determination at step 2306 may further involve analyzing other available gas diffuser assemblies 400, the axial lengths 706L of their shoulders 706, and/or the anticipated change in actual distance D1 as result of replacement. In some examples, the determination at step 2306 may additionally involve analyzing the current contact tip 356 and/or other available contact tips 356 to determine the desirability of replacement. If the determination at step 2306 is that the current distance D1 between the front face 362 of the contact tip 356 and the front end 306 of the nozzle 348 is sufficient, the method moves to step 2310, where welding operations may be begun or resumed. If the determination at step 2306 is that the current distance D1 between the front face 362 of the contact tip 356 and the front end 306 of the nozzle 348 is not sufficient, then the gas diffuser assembly 400 may be changed at step 2308 to a gas diffuser assembly 400 having a shoulder 706 with an axial length 706L that will bring the actual distance D1 closer to the desired distance. Then the method may proceed to begin or resume welding operations at step 2310.

In some examples, the position of the contact tip 356 relative to the nozzle 348 (e.g. stick out) may be adjusted by changing the nozzle 348 rather than the gas diffuser assembly 400. In such an example, the nozzle 348, rather than the gas diffuser assembly 400, may be changed in step 2308. For example, a first nozzle 348 having a first length (measured as the axial distance between the front end 306 of the nozzle 348 and the rear end 304) may be replaced by a second nozzle 348 having a second length that is different from the first length. The distance D1 between the front face 362 of the contact tip 356 and the front end 306 of the nozzle 348 would change in direct proportion to (and/or equally to) the change in axial lengths between the two nozzles 348. However, the insulator 900 of the welding torch would remain the same because the insulator 900 would be affixed to (and/or dependent on) the gas diffuser 500 rather than the nozzle 348.

In some examples, the method of FIG. 23 may be implemented in a robot welding system. In some examples, sensors may be used to determine the actual and/or desired contact tip 356 stick out distances D1. In some examples, the memory 37 may store preloaded and/or dynamically measured data relating to the available gas diffuser assemblies 400 and/or axial lengths 706L of the shoulders 706 of those assemblies. In some examples, the control circuitry 30 may be configured to assist in and/or take charge of making the determinations of steps 2304 and/or 2306. In some examples, operator input through the operator interface 28 may play a role in the determinations of steps 2304 and/or 2306. In some examples, control circuitry 30 may be configured to operate one or more actuators, robots, and/or other mechanisms to automatically disassemble and/or reassemble the nozzle assemblies 400 when implementing the method 2300.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A gas diffuser assembly for a welding torch, comprising:
    a gas diffuser having an external surface and configured to be coupled to a gooseneck of a welding torch;

an outer sleeve comprising an annular groove in an exterior surface of the outer sleeve;

a retention ring configured to fit within the annular groove, the outer sleeve and the retention ring configured to cooperate to retain a nozzle of the welding torch on the exterior surface of the outer sleeve; and an insulator disposed between the outer sleeve and the external surface of the gas diffuser, the insulator directly coupling the gas diffuser to the outer sleeve, wherein the length of the insulator extends at least the length of the outer sleeve, and the insulator and the outer sleeve extend past an end of the gas diffuser that is coupled to the gooseneck.

2. The gas diffuser assembly of claim 1, wherein the external surface comprises a grooved, knurled, textured, or cornered surface.

3. The gas diffuser assembly of claim 1, wherein the gas diffuser comprises a base having the external surface, a nose, and a hub between the base and the nose, the gas diffuser further comprising gas holes positioned on edges of the hub.

4. The gas diffuser assembly of claim 3, wherein the hub has a polygon profile comprising a plurality of faces that intersect at the edges.

5. The gas diffuser assembly of claim 1, wherein the retaining ring has one or more engagement features configured to frictionally engage a nozzle of the welding torch.

6. The gas diffuser assembly of claim 1, wherein the external surface of the gas diffuser comprises a grooved surface, wherein the outer sleeve comprises an internal grooved surface, and wherein the insulator is molded into the grooves of the outer sleeve and the gas diffuser.

7. The gas diffuser assembly of claim 6, wherein the insulator is overmolded or injection molded.

8. The gas diffuser assembly of claim 1, wherein the outer sleeve comprises one or more engagement features configured to mate with one or more complementary engagement features of the nozzle.

9. The gas diffuser assembly of claim 1, wherein an internal surface of the gas diffuser has a first end configured for coupling to a contact tip of the welding torch, and a second end configured for coupling to a gooseneck of the welding torch.

10. An arc welding torch, comprising:
a body;
a gooseneck coupled to the body;
a gas diffuser assembly coupled to the gooseneck, wherein the gas diffuser assembly comprises a gas diffuser having an external surface and configured to be coupled to the gooseneck;

an outer sleeve comprising an annular groove in an exterior surface of the outer sleeve;

a retention ring configured to fit within the annular groove, the outer sleeve and the retention ring configured to cooperate to retain a nozzle of the welding torch on the exterior surface of the outer sleeve; and an insulator disposed between the outer sleeve and the external surface of the gas diffuser, the insulator directly coupling the gas diffuser to the outer sleeve, wherein the length of the insulator extends at least the length of the outer sleeve, and the insulator and the outer sleeve extend past an end of the gas diffuser that is coupled to the gooseneck;

a contact tip retained by the gas diffuser assembly; and a nozzle coupled to the outer sleeve of the gas diffuser assembly, wherein the insulator is configured to insulate the nozzle from electrical current conducted through the gas diffuser.

11. The arc welding torch of claim 10, wherein the external surface of the gas diffuser comprises a grooved, knurled, textured, or cornered surface.

12. The arc welding torch of claim 10, wherein the gas diffuser comprises a base having the external surface, a nose, and a hub between the base and the nose, the gas diffuser further comprising gas holes positioned on edges of the hub.

13. The arc welding torch of claim 12, wherein the hub has a polygon profile.

14. The arc welding torch of claim 10, wherein the outer sleeve comprises a tapered shoulder configured to mate with a complementary taper of the nozzle, wherein a width of the shoulder determines a position of the nozzle with respect to the contact tip.

15. The arc welding torch of claim 10, wherein the gas diffuser assembly further comprises the retaining ring positioned in the annular groove of the outer sleeve, the retaining ring having one or more engagement features configured to frictionally engage the nozzle.

16. The arc welding torch of claim 10, wherein the external surface of the gas diffuser comprises a grooved surface, the outer sleeve comprises an internal grooved surface, and the insulator is molded into the grooves of the outer sleeve and the gas diffuser.

* * * * *